United States Patent
Mohan et al.

(10) Patent No.: US 11,221,741 B2
(45) Date of Patent: Jan. 11, 2022

(54) DISPLAY CONTROL OF INTERACTIVE CONTENT BASED ON DIRECTION-OF-VIEW OF OCCUPANT IN VEHICLE

(71) Applicant: SONY CORPORATION, Tokyo (JP)

(72) Inventors: Awadh Mohan, Karnataka (IN); Madhvesh Sulibhavi, Karnataka (IN)

(73) Assignee: SONY CORPORATION, Tokyo (JP)

(*) Notice: Subject to any disclaimer, the term of this patent is extended or adjusted under 35 U.S.C. 154(b) by 269 days.

(21) Appl. No.: 16/118,224

(22) Filed: Aug. 30, 2018

(65) Prior Publication Data
US 2020/0073520 A1 Mar. 5, 2020

(51) Int. Cl.
| | |
|---|---|
| G06F 3/0484 | (2013.01) |
| G06F 3/01 | (2006.01) |
| G06F 3/0482 | (2013.01) |
| G06K 9/32 | (2006.01) |
| G06Q 30/02 | (2012.01) |
| H04N 5/232 | (2006.01) |
| H04W 4/021 | (2018.01) |

(52) U.S. Cl.
CPC ............ *G06F 3/0484* (2013.01); *G06F 3/013* (2013.01); *G06F 3/0482* (2013.01); *G06K 9/3258* (2013.01); *G06Q 30/0235* (2013.01); *H04N 5/232* (2013.01); *H04W 4/021* (2013.01)

(58) Field of Classification Search
CPC ...... G06F 3/0484; G06F 3/013; G06F 3/0482; G06K 9/3258; G06Q 30/0235; G06Q 30/0643; G06Q 30/0266; H04N 5/232; H04W 4/021
See application file for complete search history.

(56) References Cited

U.S. PATENT DOCUMENTS

| | | | |
|---|---|---|---|
| 10,217,185 B1* | 2/2019 | Cabanero | G06F 1/1626 |
| 2004/0117453 A1* | 6/2004 | Cheng | H04L 29/06 709/212 |
| 2010/0185514 A1* | 7/2010 | Glazer | G06Q 30/0603 705/14.51 |
| 2015/0181200 A1* | 6/2015 | Arrasvuori | G06K 9/00671 348/46 |

(Continued)

OTHER PUBLICATIONS

NPL-16118224 (Year: 2020).*

*Primary Examiner* — Angie Badawi
(74) *Attorney, Agent, or Firm* — Chip Law Group

(57) ABSTRACT

A media display system for a vehicle that includes a first image sensor, a second image sensor, and an electronic device. The first image sensor is inside the vehicle and the second image sensor is outside the vehicle. The electronic apparatus determines a direction-of-view of an occupant of the vehicle based on user information of the occupant. The electronic apparatus further controls the second image sensor to capture a portion of view surrounding the vehicle in the determined direction-of-view of the occupant. The portion of view comprises an object-of-interest of the occupant. The electronic apparatus further control display of an interactive content on a display medium based on a user input on the object-of-interest, wherein the interactive content comprises items related to the object-of-interest. The electronic apparatus further controls navigation through the object-of-interest and remote selection of the items in the interactive content.

19 Claims, 14 Drawing Sheets

(56) References Cited

U.S. PATENT DOCUMENTS

| | | | |
|---|---|---|---|
| 2015/0256763 A1* | 9/2015 | Niemi | G06F 3/0485 |
| | | | 348/700 |
| 2016/0101734 A1* | 4/2016 | Baek | H04N 5/2253 |
| | | | 348/148 |
| 2017/0168774 A1* | 6/2017 | Sugita | G06F 3/0481 |
| 2018/0017398 A1* | 1/2018 | McNew | G01C 21/3492 |
| 2019/0236999 A1* | 8/2019 | Mertens | G06F 3/0487 |

* cited by examiner

DISPLAY CONTROL OF INTERACTIVE CONTENT BASED ON DIRECTION-OF-VIEW OF OCCUPANT IN VEHICLE

CROSS-REFERENCE TO RELATED APPLICATIONS/INCORPORATION BY REFERENCE

None.

FIELD

Various embodiments of the disclosure relate to in-vehicle display control technologies. More specifically, various embodiments of the disclosure relate to a media display system and a method to control display of interactive content based on direction-of-view of occupant in vehicle for enhanced in-vehicle shopping experience.

BACKGROUND

Currently, development of automotive electronics for use in vehicles, for example, for autonomous and non-autonomous vehicles, is one the most active area in research. Various experiments are conducted to find new avenues to increase human comfort and in-vehicle user experience. In certain scenarios, during a drive, various objects, for example, road-side shops, bill boards, or sale offers, in the vicinity of a vehicle may seek a user's attention. In such scenarios, the user may either have to physically visit a specific store to view the object or search the desired object in online search platforms through a hand-held electronic device to gain understanding. Due to paucity of time and challenges to operate a device from within a vehicle, such buying and selling opportunity for a product of interest may be lost. Thus, an advanced system may be desired for display control to provide an enhanced in-vehicle shopping experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A media display system and a method to control display of interactive content based on direction-of-view of occupant in vehicle is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method to control display of interactive content based on a direction-of-view of an occupant in a vehicle. Exemplary aspects of the disclosure provide a media display system which provides an in-vehicle shopping experience using an augmented reality (AR) and a virtual reality (VR) techniques to one or more occupants traveling in a vehicle.

The disclosed media display system may include a first image sensor, inside the vehicle, to determine user information, such as a head position/an eye gaze of an occupant of the vehicle, to determine a direction-of-view of the occupant. The media display system may further include a second image sensor, outside the vehicle, to capture a portion of a view surrounding the vehicle based on the determined direction-of-view of the occupant. The media display system further controls display of the captured portion of the view surrounding the vehicle on a display medium. Each image frame of a set of image frames in the displayed portion of the view surrounding the vehicle may include one or more objects-of-interest of the occupant. The one or more objects-of-interest may include road-side physical shop, advertisement boards, billboards, sale offers, a logo, products within the physical shop) located in the surrounding of the vehicle which the occupant may want to purchase while moving. The disclosed media display system may receive a selection of desired object-of-interest from the occupant and may further recognize the selected object-of-interest and communicate with a content source related to the selected object-of-interest. The disclosed media display system may further receive a real-time or near-real time video feed from the content source to provide the AR/VR shopping experience to the occupant while travelling. The disclosed media display system may include AR/VR enabled display medium to display the received video feed and provide a 360-degree view of different products related to the object-of-interest to the occupant. The occupant may interact with the received video feed and different products and order one or more selected products while moving along the vehicle. Thus, the disclosed media display system dynamically creates an immersive shopping environment related to the object-of-interest in the vicinity of the vehicle for different occupants of the vehicle.

Figure 1:
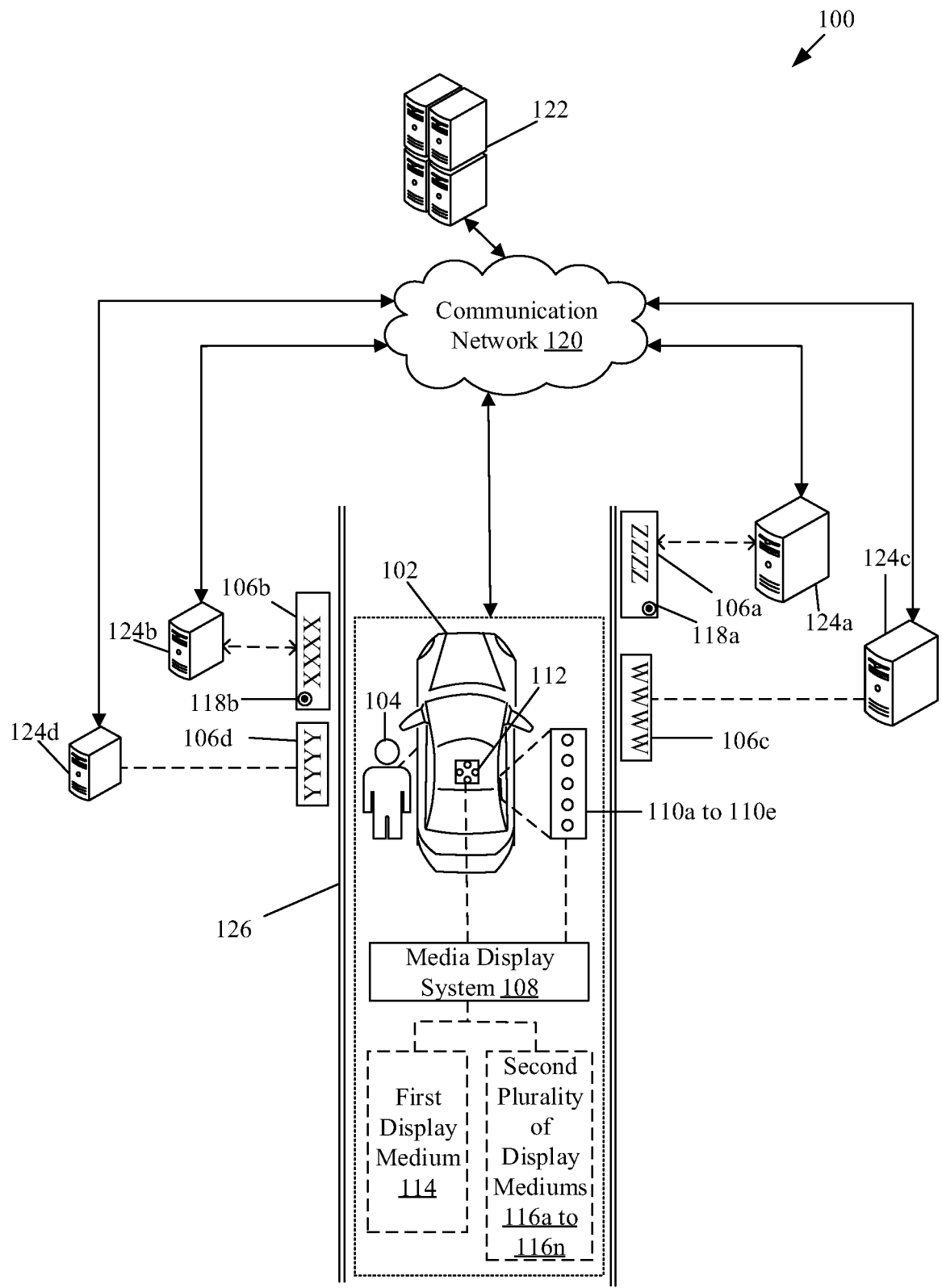
FIG. 1 is a block diagram that illustrates a network environment for control of display of interactive content based on direction-of-view of occupant in a vehicle, in accordance with an embodiment of the disclosure.

FIG. 1 is a block diagram that illustrates a network environment for control of display of interactive content based on direction-of-view of occupant in a vehicle, in accordance with an embodiment of the disclosure. With reference to FIG. 1, there is shown an exemplary network environment 100. The exemplary network environment 100 may include a vehicle 102 that may travel along a road 126. There is further shown an occupant 104 associated with the vehicle 102. There is also shown a plurality of objects-of-interest 106a to 106d located along the road 126. The vehicle 102 may include a media display system 108, a first plurality of image sensors 110a to 110e, a second image sensor 112, a first display medium 114, and a second plurality of display mediums 116a to 116n. There is also shown a first camera 118a and a second camera 118b located inside a first object-of-interest 106a and a second object-of-interest 106b of the plurality of objects-of-interest 106a to 106d, respectively. With respect to FIG. 1, there is also shown a communication network 120, a central server 122, and a plurality of local servers 124a to 124d.

The vehicle 102 may comprise suitable logic, circuitry, interfaces, and/or code through which the occupant 104 may travel along the road 126 from a start point to a destination point. The vehicle 102 may include the media display system 108. In accordance with an embodiment, the vehicle 102 may be configured to communicate with the central server 122 via the communication network 120. In some embodiments, the vehicle 102 may be configured to communicate with the plurality of local servers 124a to 124d. The vehicle 102 may be a non-autonomous, a semi-autonomous, or an autonomous vehicle. Examples of the vehicle 102 may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The plurality of objects-of-interest 106a to 106d may comprise suitable logic, circuitry, interfaces, and/or code that may be located along the road 126. Examples of the plurality objects-of-interest 106a to 106d may include, but are not limited to, road-side physical shop, a product within the physical shop, a logo, an advertisement board, or a billboard. In FIG. 1, the plurality of objects-of-interest 106a to 106d may include a first object-of-interest 106a (represented as a first physical shop), a second object-of-interest 106b (represented as a second physical shop), a third object-of-interest 106c (represented as an advertisement board), and a fourth object-of-interest 106d (represented as a billboard). In accordance with an embodiment, the plurality of objects-of-interest 106a to 106d may be configured to communicate with the vehicle 102 or the media display system 108, in accordance with various wired and wireless communication protocols.

The media display system 108 may comprise suitable logic, circuitry, interfaces, and/or code that may be configured to retrieve sensor data from a plurality of sensors (not shown) of the vehicle 102 based on one or more inputs received from the occupant 104. Example of the sensor data may include, but are not limited to, one or more images of the occupant 104 or views surrounding the vehicle 102, speed of the vehicle 102, or geo-location of the vehicle 102. In accordance with an embodiment, the media display system 108 may be configured to communicate with the central server 122 and/or the plurality of local servers 124a to 124d based on the plurality of objects-of-interest 106a to 106d recognized from the retrieved sensor data. In accordance with an embodiment, the media display system 108 may be configured to receive online shopping content from the central server 122 and/or the plurality of local servers 124a to 124d related to the plurality of objects-of-interest 106a to 106d. In accordance with an embodiment, the media display system 108 may be further configured to control the second plurality of display mediums 116a to 116n to display the received online shopping content for the occupant 104. Examples of the media display system 108 may include, but are not limited to, a vehicle control system, an in-vehicle infotainment (IVI) system, in-car entertainment (ICE) system, an embedded device, a smartphone, a human-machine interface (HMI), a computer workstation, a mainframe computer, a handheld computer, a cellular/mobile phone, a consumer electronic (CE) device, a server, and other computing devices.

The first plurality of image sensors 110a to 110e may comprise suitable logic, circuitry, interfaces, and/or code that may be disposed inside the vehicle 102 and configured to capture a 360-degree view of the interior of the vehicle 102. In accordance with an embodiment, the first plurality of image sensors 110a to 110e may be configured to capture a plurality of images of the occupant 104 inside the vehicle 102. The captured plurality of images may be utilized to determine user information such as a head position and an eye gaze of one or more occupants including the occupant 104 of the vehicle 102. The first plurality of image sensors 110a to 110e may be positioned at particular locations inside the vehicle 102. In accordance with an embodiment, the first plurality of image sensors 110a to 110e may be positioned around each of the second plurality of display mediums 116a to 116n. In accordance with an embodiment, the first plurality of image sensors 110a to 110e may be integrated in the media display system 108. In accordance with an embodiment, the first plurality of image sensors 110a to 110e may be a part of one internal image sensor (not shown) that may be installed at a center position of an internal roof (not shown) of the vehicle 102. In some embodiments, the one internal sensor image may be disposed on a platform (not shown) between seats the vehicle 102 or above one of windshields of the vehicle 102. The one internal sensor may have an unobstructed clear view of the occupant 104. Examples of the first plurality of image sensors 110a to 110e may include, but are not limited to, an imaging sensor, a wide-angle camera, an action camera, digital cameras, a closed-circuit television (CCTV) camera, a camcorder, a time-of-flight camera (TOF camera), a night-vision camera, and/or other image capturing devices.

The second image sensor 112 may comprise suitable logic, circuitry, interfaces, and/or code that may be configured to capture a two-dimensional (2-D) view or a 360- degree view of the surroundings the vehicle 102. In accordance with an embodiment, the second image sensor 112 may further include a plurality of image sensors (not shown) to capture the 360-degree view of the surroundings of the vehicle 102. Each image sensor of the plurality image sensors may be configured to capture a portion of the 360-degree view of the surroundings of the vehicle. In accordance with an embodiment, the second image sensor 112 may be configured to stitch each captured portion of the plurality image sensors to generate the 360-degree view of the surroundings of the vehicle 102. In accordance with an embodiment, the second image sensor 112 may be installed on an exterior portion (such as top or exterior roof) of the vehicle 102. In some embodiment, the second image sensor 112 may be installed in the interior (such as near one of windshields) of the vehicle 102 to obtain a clear and unhindered 360-degree view of the surroundings of the vehicle 102. Examples of the second image sensor 112 may include, but are not limited to, a 360-degree camera, an omnidirectional camera, a panoramic camera, an action camera, an imaging sensor, a wide-angle camera, digital camera, a closed-circuit television (CCTV) camera, a camcorder, a night-vision camera, a time-of-flight sensor-based camera (ToF camera), and/or other image capturing or devices with 360-degree view capturing capability.

The first display medium 114 may comprise suitable logic, circuitry, interfaces, and/or code that may be configured to display various information related to the vehicle 102, the occupant 104, or the media display system 108. In accordance with an embodiment, the first display medium 114 may be configured to display the plurality of objects-of-interest 106a to 106d included in the view surrounding the vehicle 102. In some embodiment, the first display medium 114 may be configured to display a user interface (not shown) to receive the one or more inputs from the occupant 104. In some embodiment, the first display medium 114 may be configured to display multimedia content (related to shopping) received from the central server 122 and/or the plurality of local servers 124a to 124d. In accordance with an embodiment, the first display medium 114 may be integrated in the media display system 108. The first display medium 114 may be realized through several known technologies such as, but not limited to, at least one of a touch display, Liquid Crystal Display (LCD) display, a Light Emitting Diode (LED) display, a plasma display, and an Organic LED (OLED) display technology, and other display.

The second plurality of display mediums 116a to 116n may comprise suitable logic, circuitry, interfaces, and/or code that may be configured to display the information related to the vehicle 102, the occupant 104, or the media display system 108. The second plurality of display mediums 116a to 116n may be a touch medium configured to receive the one or more inputs from the occupant 104 of the vehicle 102. In accordance with an embodiment, the second plurality of display mediums 116a to 116n may be configured to display interactive content (such as real-time or near-time video feed) related to shopping to the one or more occupants of the vehicle 102, such as the occupant 104. In some embodiments, the second plurality of display mediums 116a to 116n may be an AR/VR supported display medium to display a AR/VR shopping content received from the central server 122 and/or the plurality of local servers 124a to 124d associated with the plurality of objects-of-interest 106a to 106d. The second plurality of display mediums 116a to 116n may be configured to switch between a normal two-dimensional (2-D) mode to display the information, and an AR/VR mode to display the AR/VR shopping content.

In accordance with an embodiment, the second plurality of display mediums 116a to 116n may correspond to different windshields (such as a front windshield, a rear windshield, and one or more side windshields) of the vehicle 102. In accordance with an embodiment, different interior portions (such vehicle seat) of the vehicle 102 may act as the second plurality of display mediums 116a to 116n to display the interactive content. In accordance with an embodiment, the scope of the second plurality of display mediums 116a to 116n may not be limited to, the different windshields or the interior portions of the vehicle 102. Other display mediums, for example, a heads-up display (HUD), a heads-up display with an augmented-reality system (AR-HUD), a driver information console (DIC), a projection-based display, a see-through display, a smart glass, an AR/VR head mounted display (HMD), and/or an electro-chromic display, may be used as the second plurality of display mediums 116a to 116n. The second plurality of display mediums 116a to 116n may be a transparent or a semi-transparent display medium. In accordance with an embodiment, the first display medium 114 and the second plurality of display mediums 116a to 116n may be a flip display located at a side or at a front of a seat of the occupant 104 in the vehicle 102. In some embodiments, the second plurality of display mediums 116a to 116n may be integrated in the media display system 108.

The first camera 118a and the second camera 118b may comprise suitable logic, circuitry, interfaces, and/or code that may be configured to capture the real-time or the near-real time video feed inside the first object-of-interest 106a (represented as the first physical shop) and the second object-of-interest 106b (represented as the second physical shop) respectively. The first camera 118a and the second camera 118b may be configured to capture a 360-degree view of one or more areas or products inside the first object-of-interest 106a (represented as the first physical shop) and the second object-of-interest 106b (represented as the second physical shop). The captured 360-degree view of the one or more areas or the products may be used to generate the real-time or near-ream time video feed associated with the first object-of-interest 106a (represented as the first physical shop) and the second object-of-interest 106b (represented as the second physical shop). Examples of the first camera 118a and the second camera 118b may include, but are not limited to, a 360-degree camera, an omnidirectional camera, a panoramic camera, an action camera, an image sensor, a digital camera, a wide-angle camera, a closed-circuit television (CCTV) camera, a camcorder, a night-vision camera, a time-of-flight sensor-based camera (ToF camera), and/or other such cameras.

The communication network 120 may include a communication medium through which the vehicle 102, the central server 122 and the plurality of local servers 124a to 124d communicate. Examples of the communication network 120 may include, but are not limited to, the Internet, Internet based mobile ad-hoc networks (IMANET), a cellular network, a long-term evolution (LTE) network, a cloud network, a Personal Area Network (PAN), a Local Area Network (LAN), a Metropolitan Area Network (MAN) and/or a Wide Area Network (WAN). Various devices in the network environment 100 may be configured to connect to the communication network 120, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, and/or other wireless communication protocols.

The central server 122 may comprise suitable logic, circuitry, interfaces, and/or code that may be configured to store the interactive content (for example the real-time or the near-real time video feeds) related to the shopping. The central server 122 may be configured to store the interactive content related to the plurality of objects-of-interest 106a to 106d. In accordance with an embodiment, the central server 122 may configured to receive the interactive content from each of the plurality of local servers 124a to 124d associated with the plurality of objects-of-interest 106a to 106d. In accordance with an embodiment, the central server 122 may be configured to provide the stored interactive content (related to the shopping) to the vehicle 102 or the media display system 108 based on a content request received from the vehicle 102 or the media display system 108. In accordance with an embodiment, the central server 122 may be configured to store user profile information of the occupant 104 of the vehicle 102. In some embodiments, the central server 122 may be implemented as a cloud server, which may be utilized to execute various operations through web applications, cloud applications, HTTP requests, repository operations, file transfer, gaming operations, and the like. Examples of the central server 122 may include, but are not limited to, a cloud server, a web server, a database server, a file server, an application server, a mainframe server, or a combination thereof.

The plurality of local servers 124a to 124d may comprise suitable logic, circuitry, interfaces, and/or code that may be configured to store the interactive content (such as the real-time or near-real time video feeds) associated with the plurality of objects-of-interest 106a to 106d for shopping. Each of the plurality of local servers 124a to 124d may store the interactive content for shopping for one of the plurality of objects-of-interest 106a to 106d. In accordance with an embodiment, the plurality of local servers 124a to 124d may provide the interactive content to the vehicle 102 or the media display system 108 based on a content request received from the vehicle 102 or the media display system 108. In accordance with an embodiment, the plurality of local servers 124a to 124d associated with the plurality of objects-of-interest 106a to 106d may provide the respective interactive content to the central server 122 for shopping, via the communication network 120. The plurality of local servers 124a to 124d may be a cloud server, a web server, a database server, a file server, an application server, a mainframe server, or a combination thereof.

In operation, one of the first display medium 114 or the second plurality of display mediums 116a to 116n may receive a first input from the occupant 104, present inside the vehicle 102. The first input may be received from the occupant 104 to initiate a shopping experience inside the vehicle 102 for one the plurality of objects-of-interest 106a to 106d (for example a physical shop, an advertisement board, a billboard) outside the vehicle 102. In response to the received first input, the media display system 108 may be configured to control the first plurality of image sensors 110a to 110e, disposed inside the vehicle 102, to capture a first view of an interior of the vehicle 102. In accordance with an embodiment, the media display system 108 may be configured to capture a first plurality of image frames (as the first view) of the occupant 104 of the vehicle 102. The media display system 108 may be further configured to determine user information. The user information may comprise at least one of the eye gaze or the head position of the occupant 104 based on the captured first plurality of image frames. The media display system 108 may be further configured to determine a first direction-of-view of the occupant 104 based on the determined at least one of the eye gaze or the head position of the occupant 104. The determined first direction-of-view may indicate a specific direction in which the occupant 104 may be looking at the plurality of objects-of-interest 106a to 106d outside the vehicle 102. The determination of the first direction-of-view of the occupant 104 by the first plurality of image sensors 110a to 110e may be described in detail, for example in FIG. 4B.

In accordance with an embodiment, the media display system 108 may be further configured to control the second image sensor 112 (disposed outside the vehicle 102) to capture a first portion of a second view surrounding the vehicle 102 in the determined direction-of-view of the occupant 104. In accordance with an embodiment, an angle of capture of the second image sensor 112 may be based on a speed of the vehicle 102 in a motion-state and determined direction-of-view of the occupant 104. The angle of capture of the second image sensor 112 outside the vehicle 102 may be described in detail, for example, in FIGS. 4A and 4B.

In accordance with an embodiment, the media display system 108 may be further configured to control display of at least the first portion of the captured second view surrounding the vehicle 102 on at least one of the first display medium 114 or the second plurality of display mediums 116a to 116n for the occupant 104 inside the vehicle 102. The first portion of the captured second view in the determined direction-of-view may include a first set of image frames which may further include a first image of a first object-of-interest 106a (of the plurality of objects-of-interest 106a to 106d) of the occupant 104. Each image frame of the first set of image frames or the first image of the first object-of-interest 106a may be selectable by the occupant 104. For example, the first object-of-interest may be the first physical shop on a side of the road 126, where the side is at the direction-of-view of the occupant 104 of the vehicle 102. In accordance with an embodiment, the media display system 108 may be configured to receive a second input from the occupant 104 to select the first object-of-interest 106a (represented as the first physical shop) from the displayed first set of image frames to initiate a shopping experience related to the selected the first object-of-interest 106a. The selection of the first object-of-interest 106a (represented as the first physical shop) from the displayed first set of image frames may be described in detail, for example, in FIG. 5.

In accordance with an embodiment, the media display system 108 may be further configured to transmit a signal to request the interactive content to a first local server 124a from the plurality of local servers 124a to 124d. The first local server 124a may be associated with the selected first object-of-interest 106a. In some embodiments, the media display system 108 may be further configured to transmit the signal to request the interactive content (associated with the selected first object-of-interest 106a) to the central server 122, via the communication network 120. In accordance with an embodiment, the interactive content may include the real time or the near-time video feed captured by the first camera 118a associated with the first object-of-interest 106a. In accordance with an embodiment, the interactive content may include a 360-degree view of one or more areas or the products inside the first object-of-interest 106a (represented as the first physical shop). The interactive content may include a web site link or other stored details (such as price, availability, discount offer, dimensions or like) of the products available for shopping at the first object-of-interest 106a (represented as the first physical shop). In accordance with an embodiment, the media display system 108 may be configured to receive the interactive content from either of the central server 122 or the first local server 124a related to the first object-of-interest 106a (represented as the first physical shop). In accordance with an embodiment, the media display system 108 may be configured to switch one of the second plurality of display mediums 116a to 116n to the AR/VR mode. The media display system 108 may be configured to select one of the second plurality of display mediums 116a to 116n based on the determined direction-of-view of the occupant 104. The media display system 108 may be further configured to display the received interactive content (such as the AR/VR real-time or near-real time video feed) on the selected one of the second plurality of display mediums 116a to 116n. In accordance with an embodiment, the media display system 108 may be further configured to receive a third input from the occupant 104 to navigate the 360-degree view of the one or more areas or the products related to the first object-of-interest 106a (represented as the first physical shop). The navigation of the 360-degree view of the one or more areas or the products related to the first object-of-interest 106a may be described in detail, for example, in FIGS. 6, 7, and 9. In accordance with an embodiment, the media display system 108 may be further configured to receive a fourth input from the occupant 104 to select a product to purchase through the displayed interactive content. Thus, the disclosed media display system 108 may provide in-vehicle immersive shopping experience to the occupant 104 while travelling using the displayed AR/VR enabled interactive content which may be dynamically selected based on the plurality of objects-of-interest 106a to 106d surrounding the vehicle 102.

Figure 2:
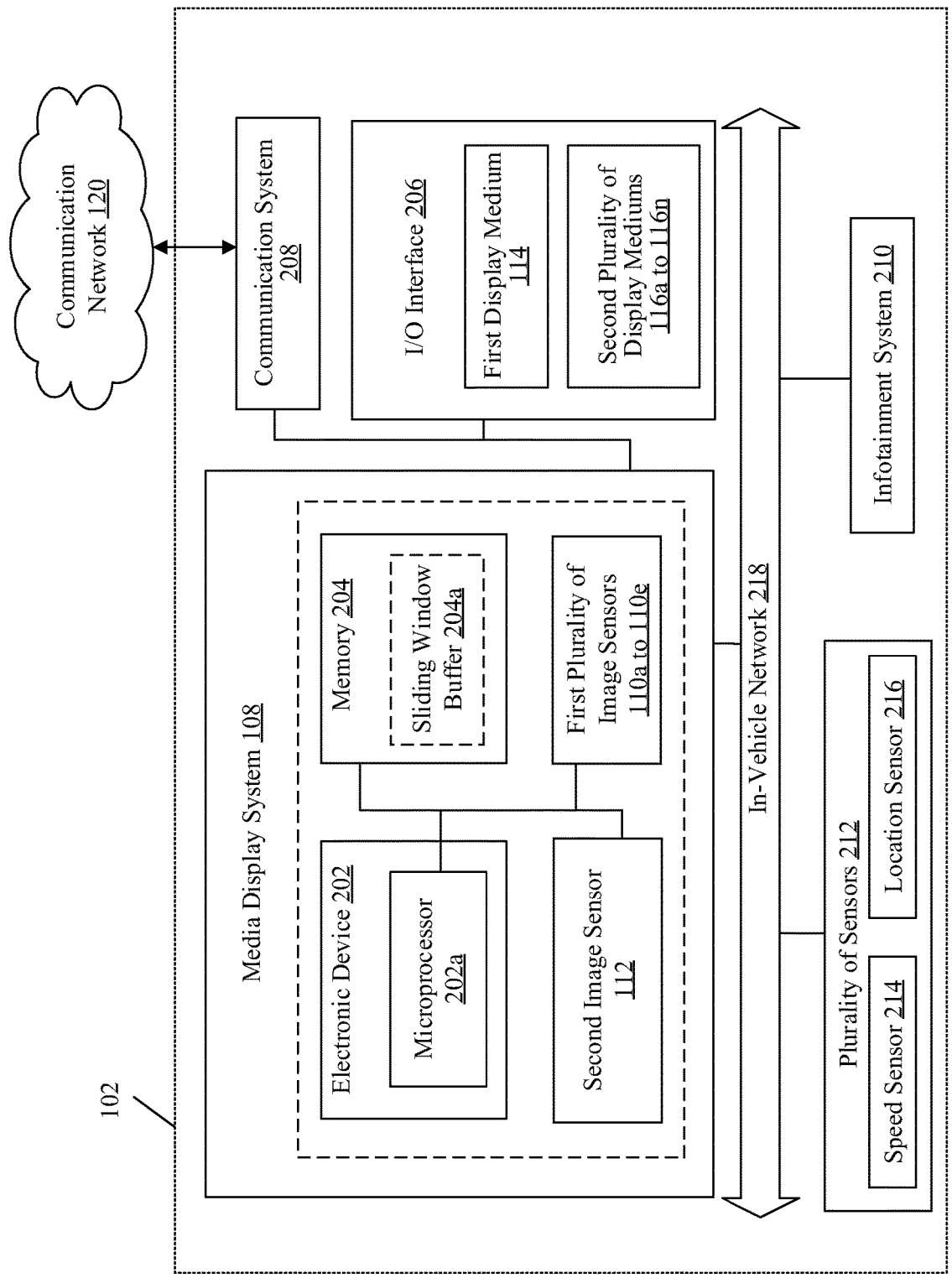
FIG. 2 is a block diagram that illustrates various exemplary components or systems of a vehicle of FIG. 1 for control of display of interactive content based on direction-of-view of occupant in the vehicle, in accordance with an embodiment of the disclosure.

FIG. 2 is a block diagram that illustrates various exemplary components or systems of a vehicle of FIG. 1 for control of display of interactive content based on direction-of-view of occupant in the vehicle, in accordance with an embodiment of the disclosure. FIG. 2 is explained in conjunction with elements from FIG. 1. With reference to FIG. 2, there is shown the vehicle 102. The vehicle 102 may comprise the media display system 108 that may include an electronic device 202 which may further include a microprocessor 202a. The media display system 108 may further include a memory 204 which may further include a sliding window buffer 204a. The media display system 108 may further include the first plurality of image sensors 110a to 110e and the second image sensor 112. The vehicle 102 may further include an Input/output (I/O) interface 206, a communication system 208, an infotainment system 210, and a plurality of sensors 212 communicatively coupled to the media display system 108 via an in-vehicle network 218. The plurality of sensors 212 may include a speed sensor 214 and a location sensor 216. The I/O interface 206 may further include the first display medium 114 and the second plurality of display mediums 116a to 116n.

The various components or systems may be communicatively coupled via the in-vehicle network 218, such as a vehicle area network (VAN), and/or an in-vehicle data bus. The microprocessor 202a may be communicatively coupled to the I/O interface 206, and the communication system 208. The communication system 208 may be configured to communicate with one or more external devices, such as the central server 122 or the plurality of local servers 124a to 124d under the control of the microprocessor 202a. A person of ordinary skill in the art will understand that the vehicle 102 may also include other suitable components or systems, in addition to the components or systems which are illustrated herein to describe and explain the function and operation of the present disclosure.

The electronic device 202 may comprise suitable logic, circuitry, interfaces, and/or code that may be configured to receive the first input and the second input to initiate the in-vehicle shopping and select the plurality of objects-of-interest 106a to 106d outside the vehicle 102, respectively. In accordance with an embodiment, the electronic device 202 may be configured to automatically control one or more components or systems (such as the memory 204, the I/O interface 206, the first plurality of image sensors 110a to 110e, and the second image sensor 112, the communication system 208, the infotainment system 210, the speed sensor 214 and the location sensor 216) of the vehicle 102 based on the received first input or the second input to provide in-vehicle shopping experience to the occupant 104. The electronic device 202 may be communicatively coupled with the in-vehicle network 218, to share produced outputs with other electronic devices of the vehicle 102.

The microprocessor 202a may comprise suitable logic, circuitry, interfaces, and/or code that may be configured to execute a set of instructions stored in the memory 204. The microprocessor 202a may be implemented based on a number of processor technologies known in the art. Examples of the microprocessor 202a may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202a. In accordance with an embodiment, the memory 204 may be configured to store different information related to the vehicle 102. The memory 204 may be further configured to store the user profile information related to the occupant 104 of the vehicle 102. In accordance with an embodiment, the memory 204 may be configured to store a list which indicates the plurality of local servers 124a to 124d associated with the plurality of objects-of-interest 106a to 106d surrounding the vehicle 102. In some embodiments, the memory 204 may be configured to store address information of the plurality of local servers 124a to 124d. In accordance with an embodiment, the memory 204 may include the sliding window buffer 204a. The sliding window buffer 204a may be configured to store the first plurality of image frames (as the first view) captured by the first plurality of image sensors 110a to 110e disposed inside the vehicle and store the first set of image frames (as the second view surrounding the vehicle 102) captured by the second image sensor 112 disposed outside the vehicle 102. Examples of implementation of the memory 204 and the sliding window buffer 204a may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The I/O interface 206 may include suitable logic, circuitry, and interfaces that may be configured to provide an I/O channel/interface between the occupant 104 and the different operational components of the vehicle 102. The I/O interface 206 may receive an input from the occupant 104 and present an output based on the provided input from the occupant 104. The I/O interface 206 may include various input and output ports to connect various other I/O devices that may communicate with different operational components of the media display system 108. Examples of an input device of the I/O interface 206 may include, but are not limited to, a touch medium, a keyboard/keypad, a set of buttons, a mouse, a joystick, a microphone, and an image-capture device. Examples of an output device of the I/O interface 206 may include, but are not limited to, a display such as the first display medium 114 and the second plurality of display mediums 116a to 116n (as described in FIG. 1), a speaker, and a haptic or any sensory output device. The input from the occupant 104 may include, but are not limited to, a touch input, a gesture input, or a voice command.

The communication system 208 may comprise suitable logic, circuitry, interfaces, and/or code that may be configured to communicate with one or more external devices, such as the central server 122, or the plurality of local servers 124a to 124d, via the communication network 120. The communication system 208 may be implemented by use of various known technologies to support wired or wireless communication of the vehicle 102 with the communication network 120. The communication system 208 may include, but is not limited to, an antenna, a telematics unit, a radio frequency (RF) transceiver, one or more amplifiers, one or more oscillators, a digital signal processor, a coder-decoder (CODEC) chipset, a subscriber identity module (SIM) card, and/or a local buffer. The communication system 208 may wirelessly communicate by use of various communication protocols of the communication network 120 (as described in FIG. 1).

The infotainment system 210 may include suitable logic, circuitry, interfaces and/or code that may be configured to provide multimedia content to the occupant 104 of the vehicle 102. In accordance with an embodiment, the infotainment system 210 may be configured to present at least audio-based data, video-based data and a user interface to the occupant 104 of the vehicle 102. The infotainment system 210 may be configured to receive the first input or the second input from the occupant 104 and present an output based on the provided first input or the second input from the occupant 104. Examples of the infotainment system 210 may include, but are not limited to, a touch medium, a keyboard/keypad, a set of buttons, a mouse, a joystick, a microphone, an image-capture device, a display a speaker, and a haptic or any sensory output device. Examples of the in-vehicle infotainment system 210 may include, but are not limited, a music system, a navigation system, a vehicle user interface (UI) system, an Internet-enabled communication system, and other entertainment systems.

The plurality of sensors 212 may comprise suitable logic, circuitry, interfaces, and/or code that may be configured to acquire one or more data parameters, such as the speed of the vehicle 102 and the geo-location of the vehicle 102. The plurality of sensors 212 may be communicatively coupled to the microprocessor 202a, to transmit the one or more acquired data parameters to the microprocessor 202a.

The speed sensor 214 may include suitable logic, circuitry, interfaces and/or code that may be configured to determine the speed of the vehicle 102 when the vehicle is in the motion-state. The speed sensor 214 may be configured to provide an electric signal indicative of the determined speed to the microprocessor 202a. Examples of the speed sensor 214, may include, but are not limited to a yaw rate sensor, a vehicle speed sensor, a tachometer, odometer sensor, an acceleration sensor, or a navigation unit that includes a global positioning system (GPS).

The location sensor 216 may include suitable logic, circuitry, interfaces and/or code that may be configured to determine the geo-location of the vehicle 102. The location sensor 216 may be operatively connected to the microprocessor 202a to provide an electric signal indicative of the determined geo-location to the microprocessor 202a. In accordance with an embodiment, the microprocessor 202a may be configured to measure a distance travelled by the vehicle 102 based on the provided electric signal indicative of the determined geo-location. Examples of the location sensor 216, may include, but are not limited to, a Global Navigation Satellite System (GNSS)-based sensor of the vehicle 102. Examples of the GNSS-based sensor may include, but are not limited to, global positioning sensor (GPS), Global Navigation Satellite System (GLONASS), or other regional navigation systems or sensors.

The in-vehicle network 218 may include a medium through which the various control units, components, and/or systems of the vehicle 102, such as the media display system 108, the I/O interface 206, the communication system 208, the infotainment system 210, the speed sensor 214, the location sensor 216, the first plurality of image sensors 110a to 110e, and the second image sensor 112, may communicate with each other. The in-vehicle network 218 may facilitate access control and/or communication between the microprocessor 202a and the media display system 108 of the vehicle 102. Various devices or components in the vehicle 102 may be configured to connect to the in-vehicle network 218, in accordance with various wired and wireless communication protocols. Examples of the wired and wireless communication protocols for the in-vehicle network 218 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The functions or operations executed by the media display system 108 or the vehicle 102, as described in FIG. 1, may be performed by the microprocessor 202a and the plurality of sensors 212 are further described, for example, in the FIGS. 3, 4A, 4B, 5, 6A, 6B, 6C, 7, and 8.

Figure 3:
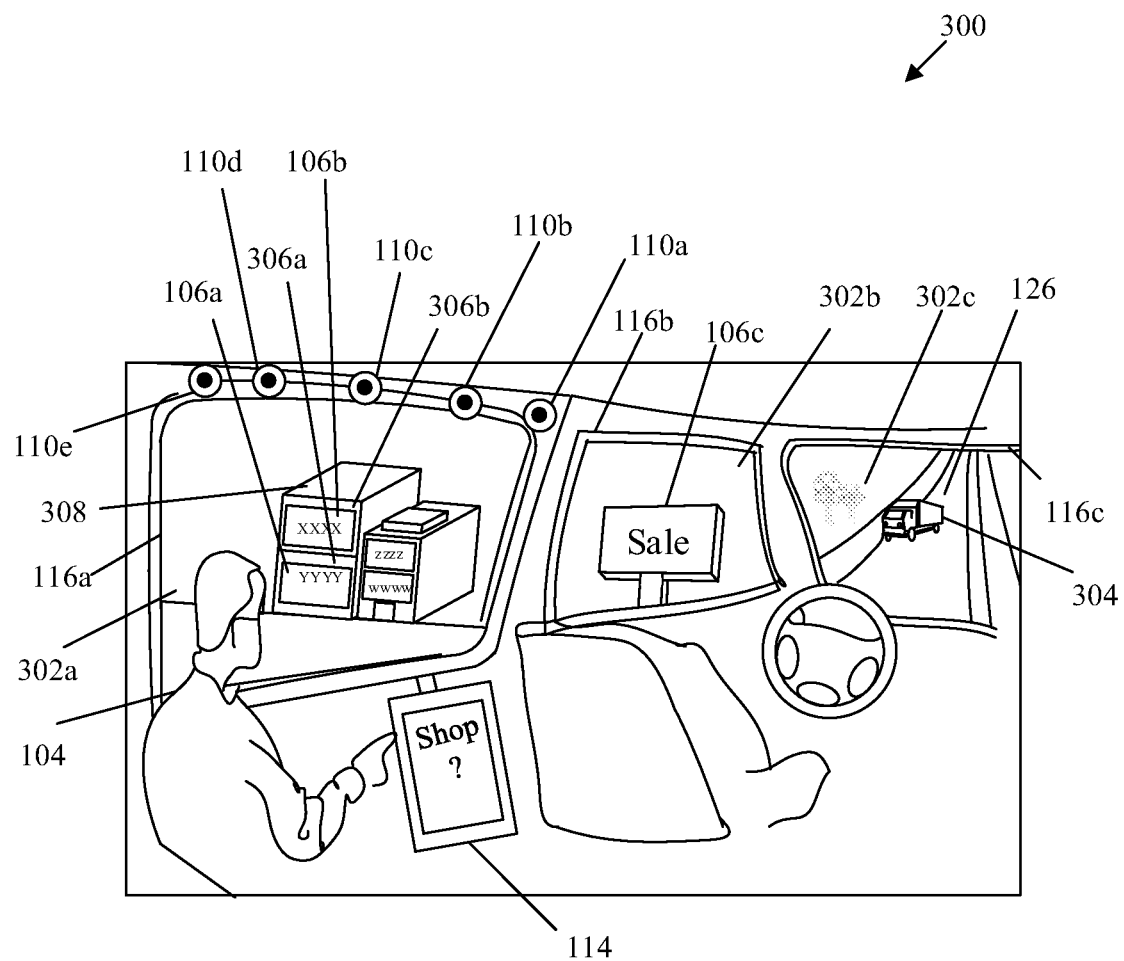
FIG. 3 illustrates a first exemplary scenario for control of display of interactive content based on direction-of-view of occupant in a vehicle of FIG. 2, in accordance with an embodiment of the disclosure.

FIG. 3 illustrates a first exemplary scenario for control of display of interactive content based on direction-of-view of occupant in a vehicle of FIG. 2, in accordance with an embodiment of the disclosure. FIG. 3 is explained in conjunction with elements from FIGS. 1 and 2. With reference to FIG. 3, there is shown a first interior environment 300 of the vehicle 102. The first interior environment 300 may include the occupant 104 present inside the vehicle 102.

In accordance with an embodiment, the microprocessor 202a may be configured to control the second image sensor 112 (as shown in FIGS. 1 and 2) to capture the second view surrounding the vehicle 102. The second image sensor 112 may be installed on the top of the vehicle 102. In accordance with an embodiment, the second image sensor 112 may be installed in the interior (such as near one of windshields) of the vehicle 102 for unobstructed and clear view of the surroundings outside the vehicle 102. The second image sensor 112 may be configured to capture the 360-degree view of the surroundings outside the vehicle 102. In accordance with an embodiment, the second image sensor 112 may be configured to capture a second plurality of image frames in all directions of the vehicle 102 to capture the 360-degree view of the surroundings outside the vehicle 102. The second image sensor 112 may be descripted in detail, for example, in FIGS. 4A and 4B. In accordance with an embodiment, the microprocessor 202a may be configured to control the memory 204 to store the captured second plurality of image frames in the sliding window buffer 204a for future use.

The occupant 104 may observe a plurality of views 302a to 302c outside the vehicle 102 from one of the windshields as the second plurality of display mediums 116a to 116d. The occupant 104 may view the plurality of objects-of-interest 106a to 106d from the plurality of views 302a to 302c outside the vehicle 102 while travelling in the vehicle 102 through the road 126. The second plurality of display mediums 116a to 116d may include a first windshield display medium 116a, a second windshield display medium 116b, and a third windshield display medium 116c. The occupant 104 may observe a first surrounding view 302a (of the plurality of views 302a to 302c) through the first windshield display medium 116a, a second surrounding view 302b (of the plurality of views 302a to 302c) through the second windshield display medium 116b, and a third surrounding view 302c (of the plurality of views 302a to 302c) through the third windshield display medium 116c, respectively. The first surrounding view 302a may include the first object-of-interest 106a and the second object-of-interest 106b. In accordance with an embodiment, the first object-of-interest 106a and the second object-of-interest 106b may be physical shops situation at a first floor 306a and at a second floor 306b of a building, respectively. The second surrounding view 302b may include the third object-of-interest 106c. In accordance with an embodiment, the third object-of-interest 106c may be an advertisement board. The third surrounding view 302c may include the road 126 on which the vehicle 102 is traveling. The third surrounding view 302c may include another vehicle 304 traveling on the road 126.

In accordance with an embodiment, the occupant 104 may like the first object-of-interest 106a included in the first surrounding view 302a. The microprocessor 202a may be configured to receive (through the I/O interface 206) the first input on the I/O interface 206 from the occupant 104, in case the occupant 104 may wish to shop or explore products related to the first object-of-interest 106a. The I/O interface 206 may be included in the first display medium 114 or one of the second plurality of display mediums 116a to 116n or the infotainment system 210 of the vehicle 102. In accordance with an embodiment, the first display medium 114 may be a flip display located in the interior of the vehicle 102.

In accordance with an embodiment, the microprocessor 202a may be configured to control the first plurality of image sensors 110a to 110e to capture the first plurality of images (as the first view) of the occupant 104. The first plurality of image sensors 110a to 110e may be installed in the interior of the vehicle 102 along the second plurality of display mediums 116a to 116n for a clear and unobstructed view of the occupant's head and face. In accordance with an embodiment, each of the first plurality of image sensors 110a to 110e may be installed along each of the second plurality of display mediums 116a to 116n respectively. With respect to FIG. 3, the first plurality of image sensors 110a to 110e are located at predefined positions alongside the first windshield display medium 116a near the occupant 104.

The microprocessor 202a may be further configured to determine user information such as the eye gaze or the head position of the occupant 104 based on the captured first plurality of images of the occupant 104. In accordance with an embodiment, the microprocessor 202a may be configured to extract different facial characteristics of the occupant 104 from the captured first plurality of images. Examples of the facial characteristics of the occupant 104 may include, but are not limited to, head, eye, pupil, nose, ear, eyebrows, mouth, cheekbones, or jawline. The microprocessor 202a may be configured to identify the eye gaze or the head position of the occupant 104 based on the extracted facial characteristics of the occupant 104 from the captured first plurality of images.

In accordance with an embodiment, the microprocessor 202a may be further configured to determine the first direction-of-view of the occupant 104 based on the determined at least one of the eye gaze or the head position of the occupant 104. The determination of the first direction-of-view of the occupant 104 based on the first plurality of images captured by the first plurality of image sensors 110a to 110e may be described in detail, for example in FIG. 4B. The direction-of-view of the occupant 104 may be the direction in which the occupant 104 is watching the view outside the vehicle 102. The determined direction-of-view may correspond to either of the first surrounding view 302a, the second surrounding view 302b, or the third surrounding view 302c view outside the vehicle 102. With respect to FIG. 3, there is shown that the direction-of-view of the occupant 104 that may correspond to the first surrounding view 302a which includes the first object-of-interest 106a (represented as the first physical shop).

In accordance with an embodiment, the microprocessor 202a may be further configured to control the second image sensor 112 to capture the first portion of the second view outside the vehicle 102 in the determined direction-of-view of the occupant 104 for a specific time period. With respect to FIG. 3, the microprocessor 202a may be configured to control the second image sensor 112 to capture the first portion of the first surrounding view 302a based on the determined direction-of-view of the occupant 104 as the first surrounding view 302a. In some embodiments, the microprocessor 202a may be configured to extract the first portion of the first surrounding view 302a from the second plurality of image frames captured in all directions of the vehicle 102. The capture of the second plurality of image frames in all directions of the vehicle 102 before the receipt of the first input (to initiate shopping) may ensure that each of the plurality of objects-of-interest 106a to 106d present in all the directions of the vehicle 102 are captured. Thus, the disclosed media display system 108 may capture each and every object-of-interest present along the road 126 for the occupant 104a which ensures better user experience for the in-vehicle shopping and enhanced monetary benefits for different organization related to the plurality of objects-of-interest 106a to 106d.

In accordance with an embodiment, the microprocessor 202a may be configured to control the memory 204 to store the captured first portion of the first surrounding view 302a outside the vehicle 102 in the sliding window buffer 204a. In accordance with an embodiment, the microprocessor 202a may be further configured to generate a timeline (for example a sliding window) of the captured first portion of the first surrounding view 302a outside the vehicle 102 in the direction-of-view of the occupant 104. The microprocessor 202a may be further configured to control display of the generated timeline on either of the first display medium 114 or the second plurality of display mediums 116a to 116n for the occupant 104. The displayed timeline of the captured first portion of the first surrounding view 302a is described, in detail, for example, in FIG. 5. The displayed timeline of images may include the first set of images frames which may include a first image of the first object-of-interest 106a, a second image of the second object-of-interest 106b or a third image of the third object-of-interest 106c. In accordance with an embodiment, the first image of the first object-of-interest 106a, the second image of the second object-of-interest 106b, or the third image of the third object-of-interest 106c may be selectable by the occupant 104.

In accordance with an embodiment, the microprocessor 202a may be configured to receive (through the I/O interface 206) the second input from the occupant 104 to select either of the first image, the second image, or the third image. In some embodiments, the microprocessor 202a may be configured to receive the second input from the occupant 104 to navigate through the first set of images frames before the selection of either of the first image, the second image, or the third image on the displayed timeline. In accordance with an embodiment, the microprocessor 202a may be further configured to include different upcoming objects-of-interest (on a route of travel of the vehicle 102) in the displayed timeline for the occupant 104. In some embodiment, the microprocessor 202a may be further configured to include the upcoming objects-of-interest based on the destination point of the vehicle 102 in the displayed timeline for the occupant 104. The microprocessor 202a may be configured to receive the second input from the occupant 104 to select an object-of-interest from the displayed upcoming objects-of-interest.

With respect to FIG. 3, the microprocessor 202a may receive the second input from the occupant 104 to select the first image of the first object-of-interest 106a. In accordance with an embodiment, the microprocessor 202a may be further configured to recognize the first object-of-interest 106a from the first image. In some embodiments, the microprocessor 202a may be configured to extract one or more keywords included in the first image using techniques such as text recognition, character recognition, or other technologies known in the art. Examples of the keyword may include, but are not limited to, a name of physical shop, text for a discount offer, a name of shopping brand, or a name of a product. In some embodiments, the microprocessor 202a may be configured to receive the second input to select the second image of the second object-of-interest 106b. The second object-of-interest 106b may be on an opposite side of the road 126. For example, the occupant 104 may be seated on a left side of the vehicle 102. The first object-of-interest 106a may be on the left side of the vehicle 102 and the second object-of-interest 106b may be on a right side of the vehicle 102. The occupant 104 may be able to select either of the first image, the second image, or the third image irrespective of the direction or side that the occupant 104 is seated in the vehicle 102.

In some embodiments, the microprocessor 202a may be configured to extract the geo-location of the vehicle 102 from the location sensor 216 and determine a local language specific to the extracted geo-location. The microprocessor may be further configured to extract the one or more keywords based on the determined language. In accordance with an embodiment, the extracted geo-location may be used as a reference to associate a meaning of the extracted one or more keywords in context of the geo-location. For example, if the geo-location of the vehicle 102 is detected to be in Japan, there might be a high probability that the one or more keywords mentioned in the first image may in Japanese language. Thus, the microprocessor 202a may be configured to extract the one or more keywords from the first image based on the Japanese language or interpret the meaning of the one or more keywords (extracted from the first image) in context of Japan as the determined geo-location. In accordance with an embodiment, the microprocessor may be further configured to recognize a name or identification code of the first object-of-interest 106a based on the one or more keywords extracted from the first image of the object-of-interest 106a. In accordance with an embodiment, the microprocessor 202a may be configured to compare the extracted one or more keywords with stored set of keywords related to the plurality of objects-of-interests 106a to 106d in the memory 204. The microprocessor 202a may be further configured to recognize the name or identification code of the first object-of-interest 106a based on the comparison. In accordance with an embodiment, the stored set of keywords related to the plurality of objects-of-interests 106a to 106d may be retrieved from the central server 122.

In accordance with an embodiment, the first image of the first object-of-interest 106a may include a uniform resource location (URL), or an encoded code (such as a barcode or a QR-based code). The microprocessor 202a may be configured to extract the URL or the encoded code and recognize the name or the identification code of the first object-of-interest 106a based on the extracted URL or the encoded code. Examples of the URL may include, but are not limited to, a website address of a physical shop, or a domain name of a shopping brand, or information to access content source related to the plurality of objects-of-interest 106a to 106d. In some embodiments, the microprocessor 202a may be configured to recognize the name or the identification code of the first object-of-interest 106a based on the geo-location of the first object-of-interest 106a (or the vehicle 102). In some embodiments, the microprocessor 202a may be configured to compare the first image with a stored plurality of images in the memory 204 to recognize the first object-of-interest 106a.

In accordance with an embodiment, the microprocessor 202a may be further configured to retrieve the list from the memory 204 to identify the first local server 124a associated with the recognized first object-of-interest 106a. In some embodiments, the microprocessor 202a may be further configured to retrieve the list from the central server 122 to identify the first local server 124a. The microprocessor 202a may be further configured to establish a first communication with the identified first local server 124a associated with the recognized first object-of-interest 106a. In accordance with an embodiment, the microprocessor 202a may be configured to transmit a connection request, via the communication system 208, to the identified first local server 124a to establish the first communication. The microprocessor 202a may be further configured to receive the interactive content from the identified first local server 124a associated with the recognized first object-of-interest 106a, via the communication system 208. In accordance with an embodiment, the interactive content may include the 360-degree view of one or more areas or the products inside the first object-of-interest 106a (represented as the first physical shop). In some embodiments, the interactive content may include, but is not limited to, the real-time or near-real time video feed of the one or more areas or the products inside the first object-of-interest 106a (represented as the first physical shop). The real-time or near-real time video feed may be captured by the first camera 118a (shown in FIG. 1) located inside the first object-of-interest 106a (represented as the first physical shop). In some embodiments, the interactive content may include, but is not limited to, product information of the available products and details of discount offers associated with the available products in the first object-of-interest 106a (represented as the first physical shop).

In some embodiments, the interactive content may include upcoming product information related to different products based on the destination point or the route of the travel of the vehicle 102. The upcoming product information may indicate different physical shops or products which may occur on the route of the travel of the vehicle 102. In accordance with an embodiment, the microprocessor 202a may be configured to receive the upcoming product information based on the extracted geo-location of the vehicle 102 on the route of the travel of the vehicle 102. In some embodiments, the microprocessor 202a may be configured to receive the upcoming product information based on a preference of the occupant 104 where information about the preference may be stored in the user profile information.

In accordance with an embodiment, the microprocessor may be configured to establish the first communication with the central server 122, via the communication system 208, to receive the interactive content as the real-time or near-real time video feed captured inside the first object-of-interest 106a (represented as the first physical shop). The central server 122 may be configured to store multiple real-time or near-real time video feeds received from each of the plurality of local servers 124a to 124d associated with the plurality of objects-of-interest 106a to 106d. In accordance with an embodiment, the microprocessor may be configured to transmit the connection request to the central server 122 to establish the first communication, via the communication system 208. The microprocessor may be further configured to receive a response from the central server 122 within a specific time period (say in few seconds or minutes), via the communication system 208. The response received with the specific time period may indicate that the central server 122 is available to establish the first communication with the media display system 108 and provide the real-time or near-real time video feed associated with the first object-of-interest 106a (represented as the first physical shop) to the media display system 108 in the vehicle 102. Similarly, the microprocessor 202a may be configured to receive the response from the first local server 124a within the specific time period to establish the first communication with the first local server 124a and receive the real-time or near-real time video feed directly from the first local server 124a. In accordance with an embodiment, the receipt of the response within the specified time period from either of the central server 122 or the first local server 124a (to provide the real-time or near-real time video feed) may be considered as an online state of communication between the media display system 108 and either of the central server 122 or the first local server 124a.

In accordance with an embodiment, since the microprocessor 202a recognizes the first object-of-interest 106a when the vehicle is in the motion-state (at a particular speed), there might be a situation where the microprocessor 204 may not be able to establish the first communication with either of the central server 122 or the first local server 124a (to receive real-time video feed) due to different issues related to connectivity. Such situation may be considered as an offline state of communication where the microprocessor 202a may not receive the response within the specified time period from either of the central server 122 or the first local server 124a. In the offline state of communication, the microprocessor 202a may be configured to retrieve predefined shopping content related to the first object-of-interest 106a from the memory 204. In accordance with an embodiment, the microprocessor 202a may be configured to retrieve predefined shopping content from the central server 122. In the offline state of communication, the microprocessor 202a may be configured to establish a second communication with a second content source (say a database in the central server 122 or the memory 204) to retrieve the shopping content related to the first object-of-interest 106a. The shopping content may be a stored shopping content and may not correspond to the real-time or near-real time video feed related to the first object-of-interest 106a. The shopping content may include, but is not limited to, a predefined website related to the first object-of-interest 106a, stored product information related to the first object-of-interest 106a, or a past stored video feed related to the first object-of-interest 106a. The first server 124a may be configured to store the past video feed of the first object-of-interest 106a on a regular basis. In accordance with an embodiment, the stored past video may be updated at a regular interval by the second content source to provide latest interactive content to the media display system 108 in the vehicle 102 to an extent. In accordance with an embodiment, the microprocessor 202a may be configured to receive the shopping content from the second content source based on the destination point or the route of the travel of the vehicle 102. In some embodiments, the microprocessor 202a may be configured to receive the shopping content based on the extracted geo-location of the vehicle 102 on the route of the travel of the vehicle 102. In some embodiments, the microprocessor 202a may be configured to receive the shopping content based on the preference of the occupant 104.

In accordance with an embodiment, the microprocessor 202a may be configured to control display of the received interactive content related to the first object-of-interest 106a to the occupant 104 on either of the first display medium 114 or one of the second plurality of display mediums 116a to 116n. In accordance with an embodiment, the microprocessor 202a may be configured to select one of the second plurality of display mediums 116a to 116n to display the interactive content based on the determined direction-of-view of the occupant 104. The microprocessor 202a may be further configured to switch the selected one of the second plurality of display mediums 116a to 116n to the AR/VR mode to display the received interactive content. In accordance with an embodiment, the microprocessor 202a may be further configured to receive (through the I/O interface 206) the third input from the occupant 104 to navigate the 360-degree view of the one or more areas or the products related to the first object-of-interest 106a. The display and navigation of the 360-degree view of the one or more areas or the products related to the first object-of-interest 106a may be described in detail, for example, in FIGS. 6, 7, and 9. The display and navigation through the interactive content displayed on the AR/VR enabled display medium may provide an immersive 360-degree shopping experience to the occupant 104 travelling in the vehicle 102. Such immersive 360-degree experience may provide an illusion to the occupant 104 that the occupant 104 may be physically present in the first object-of-interest 106a (represented as the first physical shop).

Figure 4A:
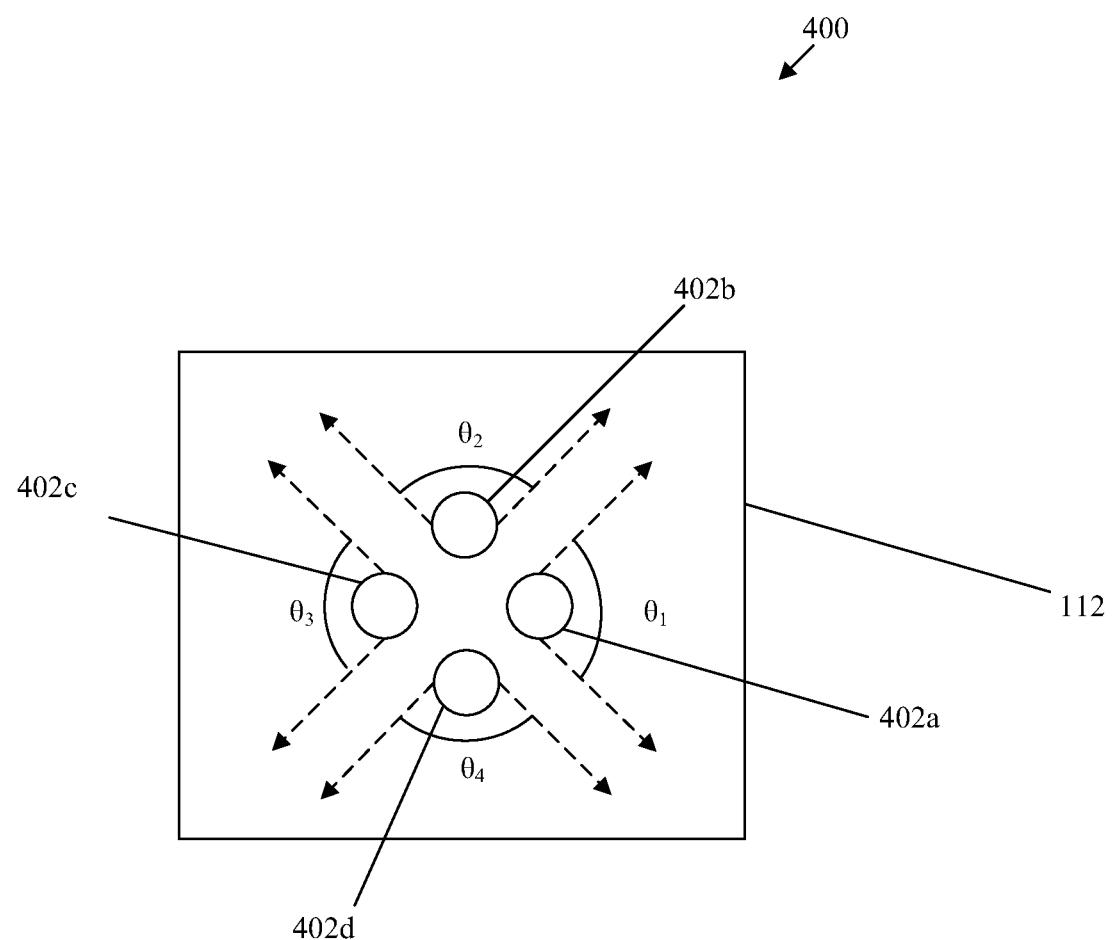
FIGS. 4A and 4B, collectively, illustrate an implementation of image sensors of a vehicle of FIG. 2 for control of display of interactive content based on direction-of-view of occupant in the vehicle, in accordance with an embodiment of the disclosure.
Figure 4B:
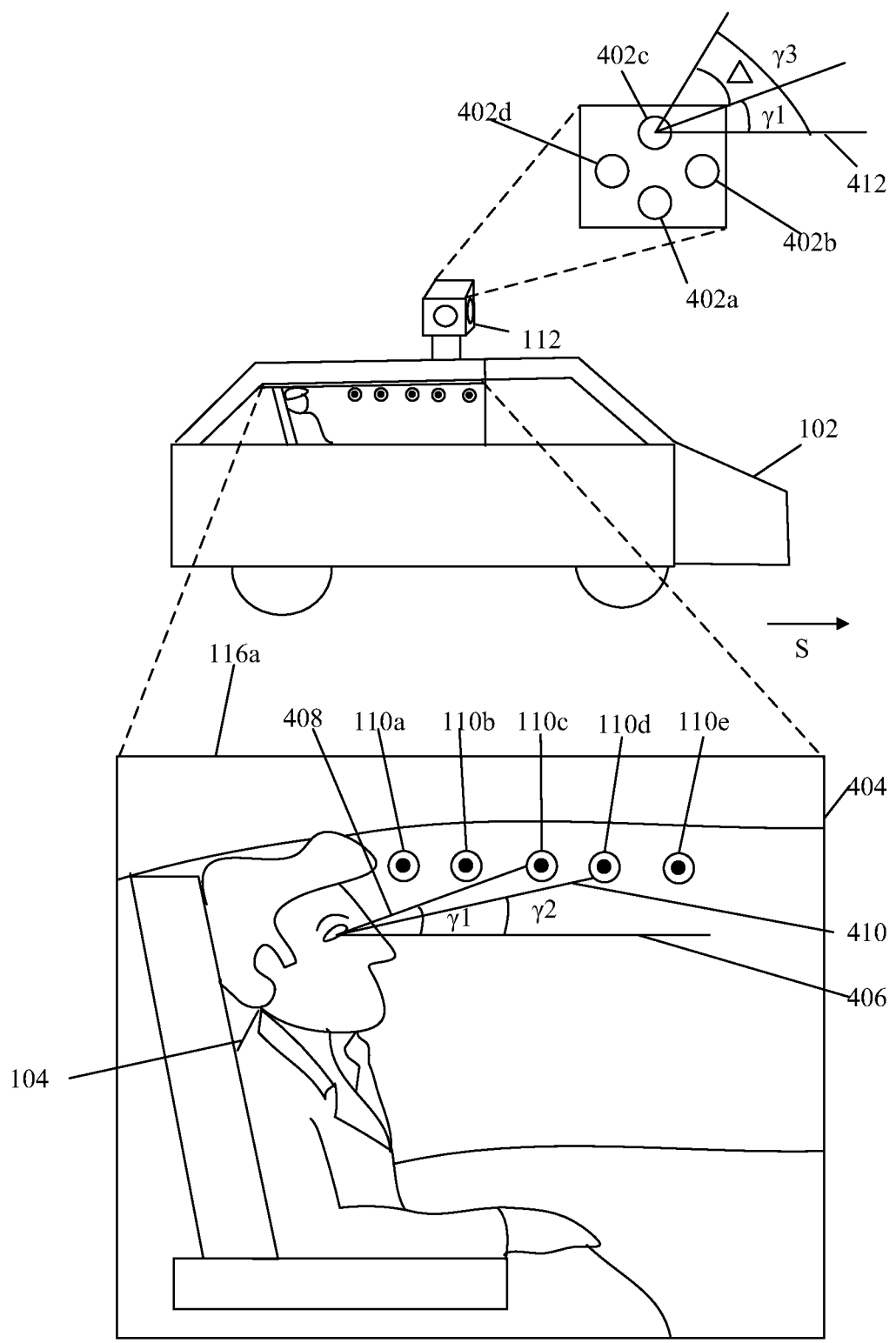

FIGS. 4A and 4B, collectively, illustrates an implementation of image sensors of a vehicle of FIG. 2 for control of display of interactive content based on direction-of-view of occupant in the vehicle, in accordance with an embodiment of the disclosure. FIG. 4A is explained in conjunction with elements from FIGS. 1, 2, and 3. With reference to FIG. 4A, there is shown a top view 400 of the second image sensor 112 that may include the plurality of image sensors 402a to 402d to capture the 360-degree view of the surroundings of the vehicle 102. The second image sensor 112 may include, for example, a first external image sensor 402a, a second external image sensor 402b, a third external image sensor 402c, and a fourth external image sensor 402d.

In accordance with an embodiment, each image sensor of the plurality of image sensors 402a to 402d may have different field-of-view (FOV), such as 90° or more, so that a complete FOV of the second image sensor 112 may be 360-degree. Thus, the second image sensor 112 may be able to capture the 360-degree view surrounding the vehicle 102. With respect to FIG. 4A, the first external image sensor 402a may have a FOV of $\theta_1$, the second external image sensor 402b may have a FOV of $\theta_2$, the third external image sensor 402c may have a FOV of $\theta_3$, and the fourth external image sensor 402d may have a FOV of $\theta_4$. In accordance with an embodiment, the FOVs of each of the plurality of image sensors 402a to 402d may overlap with each other. For example, the first external image sensor 402a may be configured to capture a left side view of the vehicle 102, the second external image sensor 402b may be configured to capture a front side view of the vehicle 102, the third external image sensor 402c may be configured to capture a right side view of the vehicle 102, and the fourth external image sensor 402d may be configured to capture a back side view of the vehicle 102. In accordance with an embodiment, the microprocessor 202a may be configured to control the second image sensor 112 to select at least one of the first external image sensor 402a, the second external image sensor 402b, the third external image sensor 402c, or the fourth external image sensor 402d to capture the first portion of the second view in the determined direction-of-view of the occupant 104. For example, in case the determined direction-of-view is in right side of the vehicle 102, the microprocessor 202a may be configured to select the third external image sensor 402c to capture the right side view (as first portion of the second view) of the vehicle 102.

With reference to FIG. 4B, there is shown an interior view 404 of the vehicle 102 and the top view 400 of the second image sensor 112. With reference to FIG. 4B, there is also shown the first plurality of image sensors 110a to 110e around the first windshield display medium 116a of the second plurality of display mediums 116a to 116n. Each image sensor of the first plurality of image sensors 110a to 110e may be placed at different predefined positions along the first windshield display medium 116a. Each image sensor of the first plurality of image sensors 110a to 110e may face in a different direction and have different line-of-view (hereinafter "LV"). In accordance with an embodiment, the memory 204 may be configured to store the predefined positions of the first plurality of image sensors 110a to 110e positioned along the first windshield display medium 116a. The predefined positions may include X-axis coordinate, a Y-axis coordinate, and a Z-axis coordinate with respect to dimensions (length, breadth, and height) of the vehicle 102. With respect to FIG. 4B, there is shown a first LV 408 of a first sensor 110c (of the first plurality of image sensors 110a to 110e), a second LV 410 of a second sensor 110d (of the first plurality of image sensors 110a to 110e), a first reference line 406. The first reference line 406 may indicate a direction of travel of the vehicle 102.

In accordance with an embodiment, each sensor of the first plurality of image sensors 110a to 110e may be configured to capture a LV image of the occupant 104 to determine the direction-of-view of the occupant 104. For example, the first sensor 110c may be configured to capture a first LV image of the occupant 104 in the first LV 408, and the second sensor 110d may be configured to capture a second LV image of the occupant 104 in the second LV 410. In accordance with an embodiment, the microprocessor 202a may be configured to analyze one or more facial features of the occupant 104 captured in the first LV image and the second LV image to determine the direction-of-view of the occupant 104. Examples of the facial features may include, but are not limited to, position of eyes, position of nose, position of lips, position of ears, position of cheekbone, and position of eyebrows. The microprocessor 202a may be configured to determine towards which of the first sensor 110c or the second sensor 110d the occupant 104 may be looking based on the analysis of the one or more facial features of the occupant 104 in the captured first LV image and the second LV image.

In one example, the microprocessor 202a may determine that the occupant 104 is looking towards the first sensor 110c in case the analysis of the one or more facial features in the captured first LV image indicates zero-degree deviation of a face (or head/eye) of the occupant 104 with respect to the first LV 408 of the first sensor 110c. In such case, a first line-of-sight of the occupant 104 matches with the first LV 408 of the first sensor 110c. The microprocessor 202a may be configured to determine a first angle of deviation $\mho_1$ of the head position (or the eye gaze) of the occupant 104 between the first LV 408 and the first reference line 406. The microprocessor 202a may be configured to determine the direction-of-view of the occupant 104 as the determined first angle of deviation $\mho$ based on a determination that the one or more facial features in the captured first LV image indicates the zero-degree deviation of the face of the occupant 104 with respect to the first LV 408.

In another example, the microprocessor 202a may determine that the occupant 104 is looking to the second sensor 110d in case the analysis of the one or more facial features in the captured second LV image indicates the zero-degree deviation of the face (or head/eye) of the occupant 104 with respect to the second LV 410 of the second sensor 110d. In such case, the line-of-sight of the occupant 104 matches with the second LV 410 of the second sensor 110d and the microprocessor 202a may be configured to determine a second angle of deviation $\mho$ of the head position (or the eye gaze) of the occupant 104 between the second LV 410 and the first reference line 406. The microprocessor 202a may be configured to determine the direction-of-view of the occupant 104 as the determined second angle of deviation $\mho$ based on a determination that the one or more facial features in the captured second LV image indicates the zero-degree deviation of the face of the occupant 104 with respect to the second LV 410.

In accordance with an embodiment, the microprocessor 202a may be configured to analyze LV images captured by each of first plurality of image sensors 110a to 110e to determine the exact direction-of-view of the occupant 104. In some embodiments, the microprocessor 202a may be configured to determine the exact direction-of-view of the occupant 104 based on stored positions (XYZ coordinates)

and captured LV images of the first plurality of image sensors 110a to 110. With the utilization of multiple image sensors (as the first plurality of image sensors 110a to 110e), the media display system 108 may ensure accurate determination of the direction-of-view of the occupant 104. Such accurate determination of the direction-of-view of the occupant 104 may not be possible with a camera of a handheld device (such as a tablet, smartphone, or personal computer), where the occupant 104 has to manually direct the camera of the handheld device in the required direction by himself.

In accordance with an embodiment, the vehicle 102 may comprise only one image sensor 110a. The image sensor 110a may be configured to capture a plurality of images of a plurality of the occupant 104 of the vehicle 102. The microprocessor 202a may store the captured plurality of images in the memory 204 as a training data set. The microprocessor 202a may be further configured to perform feature extraction and image segmentation on each image of the plurality of images using known technologies such as facial recognition and posture recognition. The microprocessor 202a may be configured to determine user information such as the head position and the eye gaze of the occupant 104 for each image of the plurality of images based on a machine learning (ML) algorithm. The microprocessor 202a may be further configured to store the determined user information with the corresponding image in a ML database of the memory 204 as the training data set. The microprocessor 202a may be configured to capture current images of the occupant 104 based on the first input. The microprocessor 202a may be configured to determine a first angle of deviation $\vartheta$ of the head position (or the eye gaze) of the occupant 104 based on the comparison of the current images of the occupant 104 and the training data set saved in the ML database. The image sensor 110a may be configured to determine user information such as the head position and the eye gaze of multiple occupants in the vehicle 102 simultaneously. Thus, a single image sensor 110a may be cost efficient.

In accordance with an embodiment, the microprocessor 202a may be configured to provide the determined direction-of-view (as the first angle of deviation $\vartheta$ or the second angle of deviation $\vartheta$ with respect to the first reference line 406 to the second image sensor 112. With respect to FIG. 4B, there is also shown the top view 400 of the second image sensor 112. Further, there is also shown an angle of capture $\vartheta_3$ of the second image sensor 112 from a second reference line 412. In accordance with an embodiment, the second image sensor 112 may be configured to calculate the angle of capture $\vartheta_3$ of the second image sensor 112 based on the received direction-of-view of the occupant 104. In some embodiments, the microprocessor 202a may be configured to calculate the angle of capture $\vartheta_3$ of the second image sensor 112 based on the determined direction-of-view of the occupant 104. In a situation, where the vehicle 102 travels at a particular speed, the angle of capture $\vartheta_3$ of the second image sensor 112 may not be similar to the determined direction-of-view of the occupant 104. In such situations, the angle of capture $\vartheta_3$ of the second image sensor 112 may be higher than the determined direction-of-view of the occupant 104. With the angle of capture $\vartheta_3$ of the second image sensor 112 higher than the determined direction-of-view of the occupant 104, the second image sensor 112 may not miss the capture of an object-of-interest which may be of interest for the occupant 104 for shopping while travelling in the vehicle 102 at the particular speed. For example, the microprocessor 202a may determine the direction-of-view of the occupant 104 as the determined first angle of deviation $\vartheta_1$ (with respect to the first reference line 406) as 20 degrees. The microprocessor 202a may be configured to calculate the angle of capture $\vartheta_3$ of the second image sensor 112 as a sum of a predefined angle deviation $\Delta$ (as delta) and the determined the direction-of-view as the determined first angle of deviation $\vartheta_1$. In case, the predefined angle deviation $\Delta$ may be 10 degrees, the calculated angle of capture $\vartheta_3$ of the second image sensor 112 may be 30 degrees from the second reference line 412.

Figure 5:
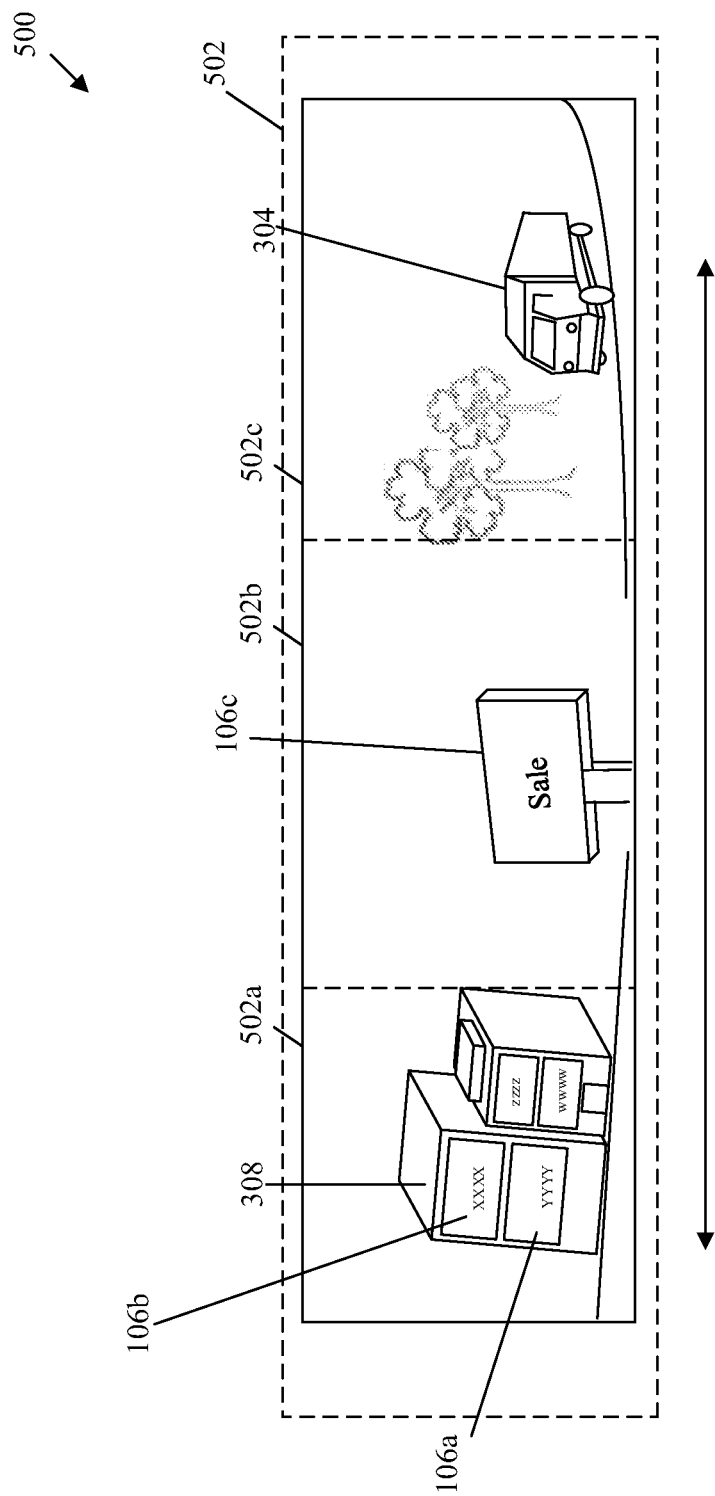
FIG. 5 illustrates a second exemplary scenario for selection of an object-of-interest surrounding a vehicle of FIG. 2 for control of display of interactive content based on direction-of-view of occupant in the vehicle, in accordance with an embodiment of the disclosure.

FIG. 5 illustrates a second exemplary scenario for selection of an object-of-interest surrounding a vehicle of FIG. 2 for control of display of interactive content based on direction-of-view of occupant in the vehicle, in accordance with an embodiment of the disclosure. FIG. 5 is explained in conjunction with elements from FIGS. 1, 2, 3, 4A, and 4B. With reference to FIG. 5, there is shown a first set of image frames 502 captured by the second image sensor 112 while the vehicle 102 is in the motion-state. In accordance with an embodiment, the first set of image frames 502 may be captured by the second image sensor 112 while the vehicle 102 is in a non-motion-state. The first set of image frames 502 may include the second view surrounding the vehicle 102 which may be captured by the second image sensor 112 in the determined direction-of-view of the occupant 104. The first set of image frames 502 may include a first image frame 502a, a second image frame 502b, and a third image frame 502c. In accordance with an embodiment, the first image frame 502a may include the first image of the first object-of-interest 106a and the second image of the second object-of-interest 106b, the second image frame 502b may include a third image of the third object-of-interest 106c, and the third image frame 502c may include a fourth image of the other vehicle 304 (as shown in FIG. 3). In accordance with an embodiment, the first set of image frames 502 may be displayed (as the sliding window) on at least one of the first display medium 114 or one of the second plurality of display mediums 116a to 116n for the occupant 104. The microprocessor 202a may be configured to receive the second input from the occupant 104 to navigate the displayed first set of image frames 502 in a left direction or right direction to find an object the occupant 104 wishes to select for shopping. In accordance with an embodiment, the microprocessor 202a may be configured to receive the second input from the occupant 104 to scroll the displayed first set of image frames 502 in the left direction or right direction to select the object for shopping. In accordance with an embodiment, the microprocessor 202a may be configured to store the first set of image frames 502 in the memory 204. The microprocessor 202a may be further configured to retrieve image frames (the first image frame 502a, the second image frame 502b, or the third image frame 502c) from the memory 204 based on the scrolling of the displayed first set of image frames 502 in the left direction or right direction. For example, in case the occupant 104 scrolls the displayed first set of image frames 502 in the left direction, the microprocessor 202a may retrieve and display a next image frame stored next to the first set of image frames 502. Further, in case the occupant 104 scrolls the displayed first set of image frames 502 in the right direction, the microprocessor 202a may retrieve and display a previous image frame stored prior to the first set of image frames 502.

In accordance with an embodiment, the first set of image frames 502 may be stored in the sliding window buffer 204a (as shown in FIG. 2). The sliding window buffer 204a may be configured to store a predetermined number of image frames. In accordance with an embodiment, the microprocessor 202a may be configured to determine the predetermined number based on the speed of the vehicle 102 and a storage capacity of the sliding window buffer 204a. In accordance with an embodiment, the microprocessor 202a may be configured to delete an image frame from the stored first set of image frames 502 based on the storage capacity of the sliding window buffer 204a. For example, when the storage capacity is full, the microprocessor 202a may be configured to delete an image frame (as oldest stored frame) from the sliding window buffer 204a.

In accordance with an embodiment, the microprocessor 202a may be configured to retrieve the stored first set of image frames 502 from the sliding window buffer 204a and display the retrieved first set of image frames 502 on one of the first display medium 114 or one of the second plurality of display mediums 116a to 116n for the occupant 104. With respect to FIG. 3, the microprocessor 202a may receive (through the I/O interface 206) the fourth input from the occupant 104 to select (for shopping) either of the first object-of-interest 106a, the second object-of-interest 106b, or the third object-of-interest 106c displayed on one of the first display medium 114 or one of the second plurality of display mediums 116a to 116n. Thus, the storage of the first set of image frames 502 (say captured for a particular time-period by the second image sensor 112) in the sliding window buffer 204a may provide enough flexibility to the occupant 104 to dynamically select one of the plurality of objects-of-interest 106a to 106d (for shopping) even-though an object-of-interest (to be selected for shopping) may have passed from a current view of the occupant 104 travelling in the vehicle 102 at the particular speed.

In accordance with an embodiment, the microprocessor 202a may be configured to determine a recording rate of the sliding window buffer 204a or a capture rate of the second image sensor 112 based on the speed of the vehicle 102 measured by the speed sensor 214. In accordance with an embodiment, the recording rate of the sliding window buffer 204a or the capture rate of the second image sensor 112 may be directly proportional to the speed of the vehicle 102. For example, for the vehicle 102 travelling at the speed of 100 km/hour (i.e. approximately 27 m/s), the microprocessor 202a may be configured to set the recording rate or the capture rate as 27 frames/second. Similarly, for the vehicle 102 travelling at the speed of 180 km/hour (i.e. approximately 50 m/s), the microprocessor 202a may be configured to set the recording rate or the capture rate as 50 frames/second.

In accordance with an embodiment, the microprocessor 202a may be configured to set a threshold of displacement of an object-of-interest between two consecutive captured frames in the first set of image frames 502. In accordance with an embodiment, the recording rate of the sliding window buffer 204a or the capture rate of the second image sensor 112 may be directly proportional to the speed of the vehicle 102 and inversely proportional to the set threshold displacement. For example, in case the microprocessor 202a sets the threshold of displacement of the object-of-interest between two consecutive captured frames as 1 centimeter (cm) and the speed of the vehicle 102 as 27 m/s, the microprocessor 202a may be configured to set the recording rate or the capture rate as 27 frames/second. This may indicate that the second image sensor 112 may capture one image frame for one meter of distance travelled by the vehicle 102 in one second. Thus, the disclosed media display system 108 may provide the capture of the plurality of objects-of-interest 106a to 106d surrounding the vehicle 102 with high accuracy so that the occupant 104 may not miss a single object of the plurality of objects-of-interest 106a to 106d in the surrounding even though the speed of the vehicle 102 is high.

Figure 6A:
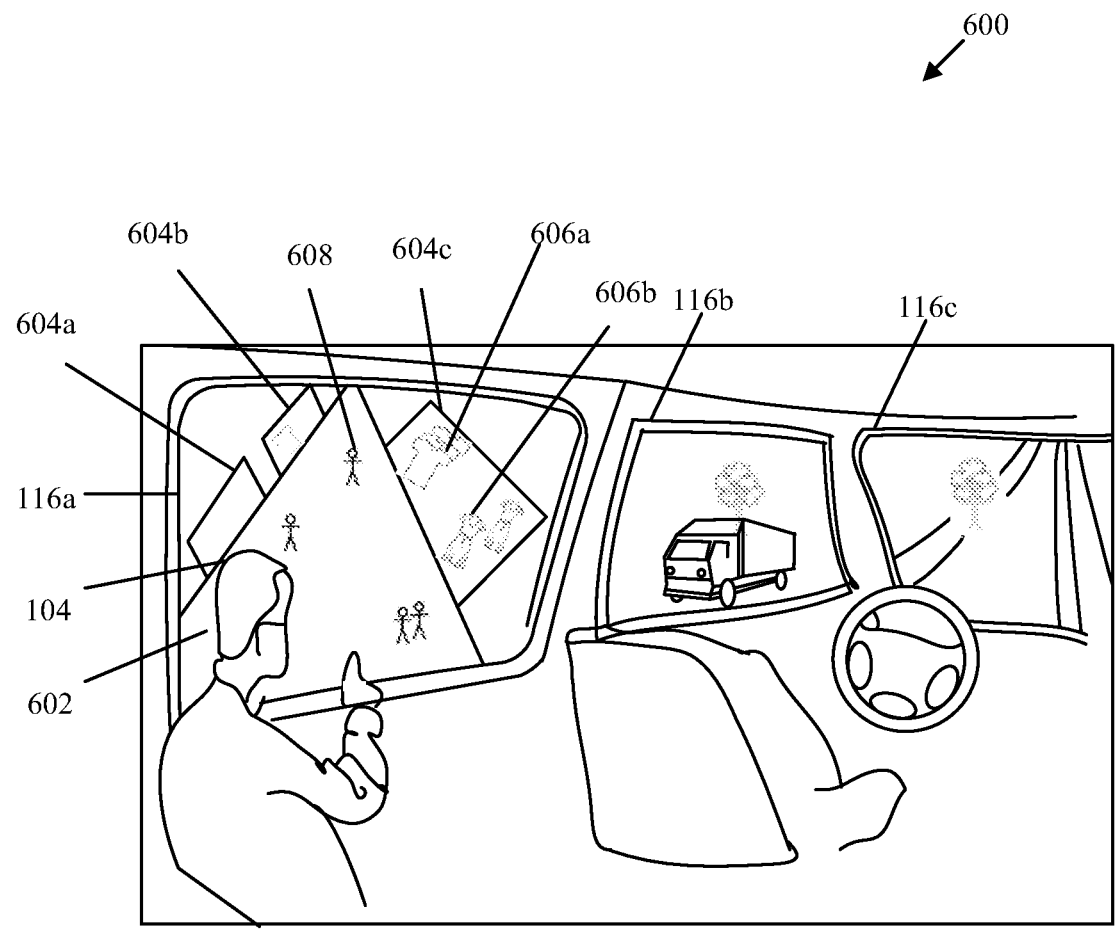
FIGS. 6A, 6B, and 6C, collectively, illustrate a third exemplary scenario for control of display of interactive content based on direction-of-view of occupant in a vehicle of FIG. 2, in accordance with an embodiment of the disclosure.
Figure 6B:
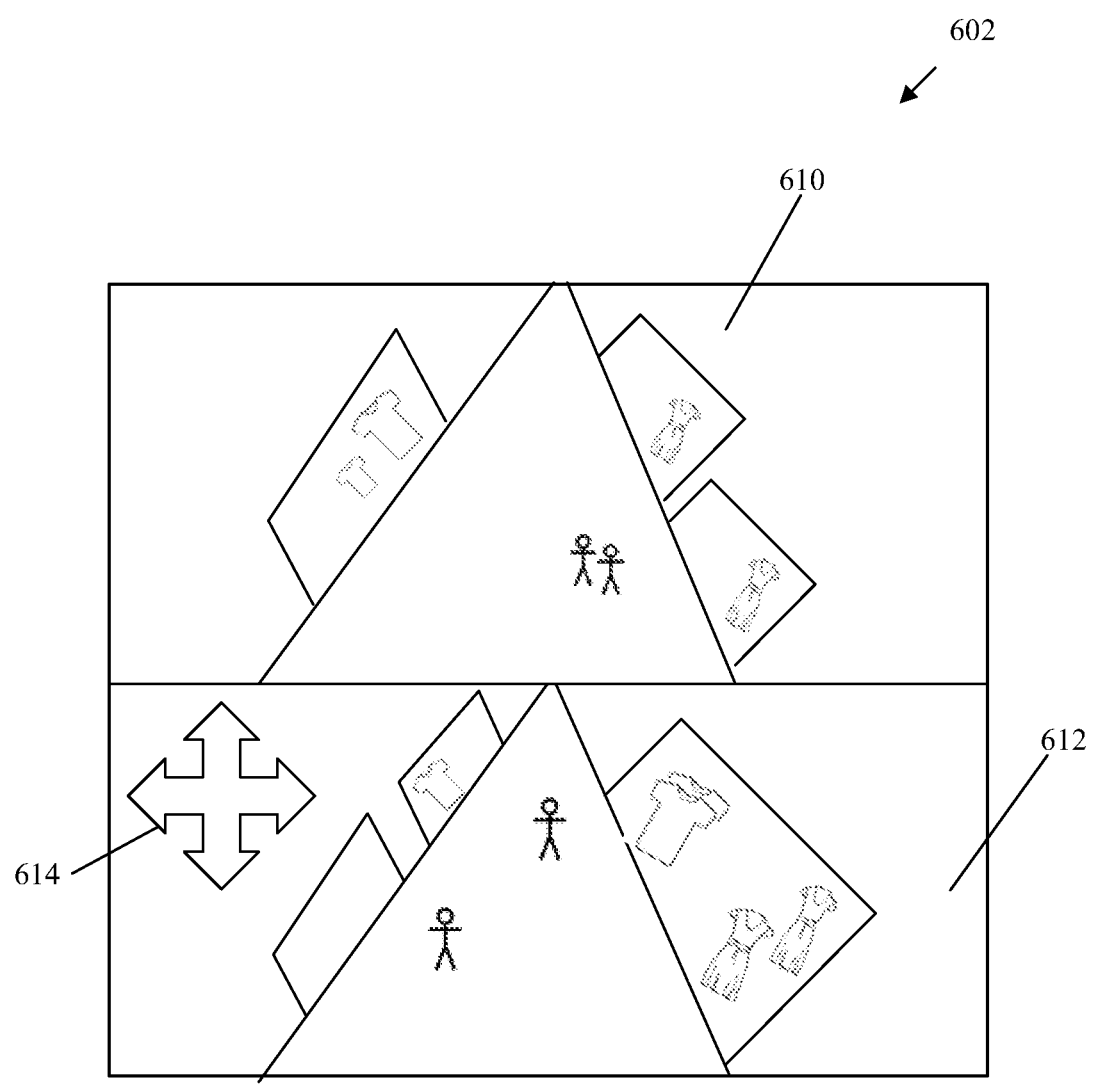
Figure 6C:
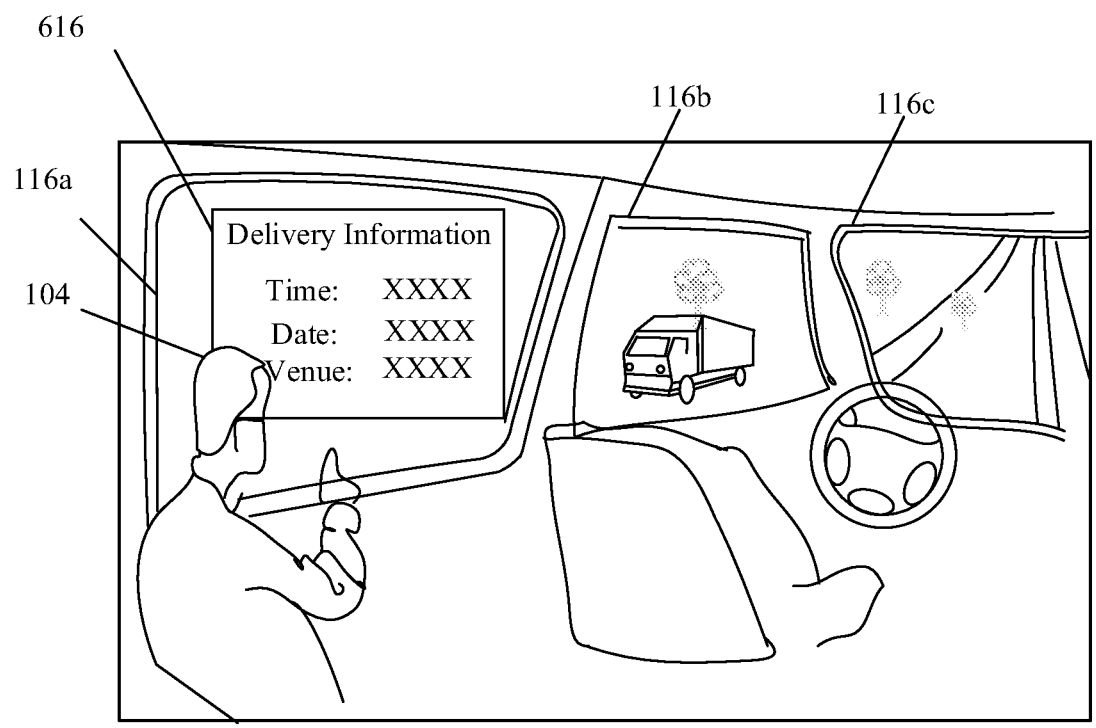

FIGS. 6A, 6B, and 6C, collectively, illustrate third exemplary scenario for control of display of interactive content based on direction-of-view of occupant in a vehicle of FIG. 2, in accordance with an embodiment of the disclosure. FIG. 6 is explained in conjunction with elements from FIGS. 1, 2, 3, 4A, 4B, and 5. With reference to FIG. 6, there is shown a second interior environment 600 of the vehicle 102. The second interior environment 600 may include the occupant 104 present inside the vehicle 102. With respect to FIG. 6, there is also shown a scene 602 displayed on the first windshield display medium 116a. The scene 602 may be the interactive content as the real-time or near-real time video feed of the one or more areas or the products inside the first object-of-interest 106a (represented as the first physical shop). The microprocessor 202a may be configured to switch the first windshield display medium 116a from the normal 2D mode to the AR/VR mode to display the scene 602 as the real-time or near-real time video feed as described in FIG. 3. The displayed interactive content of the scene 602 may indicate the 360-degree view of the one or more areas or the products inside the first object-of-interest 106a (as the first physical shop) captured by the first camera 118a (of FIG. 1). In accordance with an embodiment, as described in FIG. 3, in online state of communication, the displayed scene 602 (as 360-degree view of the first object-of-interest 106a) may be received from the either of the central server 122 or the first local server 124a associated with the first object-of-interest 106a while the occupant 104 may be travelling in the vehicle 102.

In accordance with an embodiment, the displayed scene 602 may include a plurality of images of stores 604a to 604c (for example situated on a ground floor) of the first object-of-interest 106a (represented as the first physical shop). The plurality of images of stores 604a to 604c may include a first store image 604a, a second store image 604b, and a third store image 604c. The displayed scene 602 may further include a plurality of products images (for example a T-shirt image 606a and a dress image 606b). The displayed scene 602 may further include other shoppers, such as shopper 608 who are physically present inside the first object-of-interest 106a (as the first physical shop).

In accordance with an embodiment, the microprocessor 202a may be configured to receive, through the I/O Interface 206, the third input to navigate through plurality of images of stores 604a to 604c and the plurality of products images included in the displayed scene 602. In accordance with an embodiment, the third input from the occupant 104 may include, but is not limited to the touch input, the gesture input, or the voice command. In some embodiment, the microprocessor 202a may be configured to receive the third input to navigate through multiple areas or locations (for example rooms or floors) of the first object-of-interest 106a (as the first physical shop).

With respect to FIG. 6B, there is shown the scene 602 which includes a first floor image 610 and a ground floor image 612 captured by the first camera 118a associated with the first object-of-interest 106a (as the first physical shop). Further, there is also shown a user interface (UI) 614. In accordance with an embodiment the microprocessor 202a may be configured to receive the third input to navigate in different directions (left, right, up, and down) of the first object-of-interest 106a (as the first physical shop) using the UI 614. In some embodiments, the microprocessor 202a may be configured to receive a specific user input (as the third input) from the occupant 104 to move between different floors of the first object-of-interest 106a. In accordance with an embodiment, the scene 602 may include other UI (not shown) to perform a zoom operation on displayed the scene 602 to navigate the one or more areas or the products related to the scene 602. For example, the microprocessor 202a may receive (through the I/O interface 206) an up gesture on the displayed scene 602 from the occupant 104 to navigate from a lower floor to an upper floor of the first object-of-interest 106a. In accordance with an embodiment, the microprocessor 202a may be configured to transmit the third input (for navigation) to the first local servers 124a (i.e. from where the real-time or near-real time video feed of the scene 602 may be received). The first local servers 124a may be configured to control a plurality of cameras disposed inside the first object-of-interest 106a based on the received third input. For example, in case the first local servers 124a determines that occupant 104 may want to navigate to the upper floor, the first local servers 124a may be configured to activate (or select) an upper floor camera disposed on the upper floor of the first object-of-interest 106a and send the scene 602 captured by the upper floor camera to the media display system 108 of the vehicle 102. Thus, the media display system 108 inside the vehicle 102 may be able to provide the real and immersive shopping experience to the occupant 104 while travelling in the vehicle. Such shopping in-vehicle experience is similar to an experience that the occupant is physically present in the first object-of-interest 106a (as the first physical shop).

In accordance with an embodiment, the first camera 118a may be configured to capture a 360-degree view of one or more areas or products inside the first object-of-interest 106a. The 360-degree view may be represented by projection based frame such as cubic/equirectangular projection. Each projection may comprise a plurality of parts such as, a front, a back, a left-side, a right-side, a top, and a bottom. The microprocessor 202a may be configured to receive the third input to navigate to a part that may not be part of the current projection. The microprocessor 202a may be configured to communicate a request to the first camera 118a for the next projection frame that comprises the part in the third input. For example, a projection of the ground floor image 612 may be displayed to the occupant 104. The occupant 104 may navigate to an extreme end of the top part of the ground floor image 612. The microprocessor 202a may communicate a request to the first camera 118a via the communication network 120 for the parts of the next projection such as the first floor image 610.

In accordance with an embodiment, each floor of the first object-of-interest 106a may comprise a lift or a staircase to link the each floor with other floors of the first object-of-interest 106a. The lift or the staircase may be selectable by the occupant 104. The microprocessor 202a may be configured to receive the third user input on at least one of the lift or the staircase. The microprocessor 202a may be further configured to move between the different floors of the first object-of-interest 106a based on the third input on the lift or the staircase. The lift and the staircase may comprise two selectable directions such as an up direction and a down direction. The microprocessor 202a may be configured to navigate to a floor above based on the third input on the up direction of the lift or the staircase and navigate to a floor below based on the third input on the down direction of the lift or the staircase. For example, the occupant 104 may select the up direction of a staircase on the ground floor image 612. The microprocessor 202a may be configured to navigate to the first floor image 610 based on the selected up direction.

In accordance with an embodiment, the microprocessor 202a may be configured to receive the fourth input (through the I/O Interface 206), from the occupant 104 to select a product from the displayed scene 602. In accordance with an embodiment, the fourth input from the occupant 104 may include, but is not limited to the touch input, the gesture input, or the voice command. In accordance with an embodiment, the microprocessor 202a may be configured to display product information on the selected product on the displayed scene 602. The product information may include, but is not limited to, a 360° view of the selected product, a cost of the selected product, a sale offer associated with the selected product, a material of the selected product, dimensions of the selected product, or a date of manufacture of the selected product. The 360° view of the product may be captured by the first camera 118a or may be a pre-stored 360° view of the product. The microprocessor 202a may be configured to retrieve the product information from either of the central server 122 or the first local server 124a associated with the first object-of-interest 106a.

In accordance with an embodiment, the microprocessor 202a may be configured to receive the fourth input to select the product from the displayed scene 602 for shopping. The microprocessor 202a may be configured to transmit a purchase request to the central server 122. The purchase request may include product identification information related to the selected product. The central server may be configured to check availability of the selected product with the first server 124a and transmit a payment request to the microprocessor 202a in case the selected product is indicated as available by the first local server 124a. In accordance with an embodiment, the microprocessor may be configured to send the purchase request directly to the first local server 124a associated with the first object-of-interest 106a (as the first physical shop). The microprocessor 202a may be further configured to display the payment request on the first windshield display medium 116a. The microprocessor 202a may be further configured to receive a payment input (for example as account details, credit/debit card number) from the occupant 104 to initiate a payment related to the payment request via different online payment techniques known in the art. In accordance with an embodiment, the microprocessor 202a may be further configured to receive, via the displayed scene 602, details related to a delivery of the selected product from the occupant 104. With respect to FIG. 6C, there is shown delivery information 616. The delivery information 616 may indicate the details related to a delivery of the selected product. The delivery information 616 may include, but are not limited to, a date of delivery, a time of delivery, or a venue of delivery. In accordance with an embodiment, the microprocessor 202a may be configured to determine the delivery information 616 based on the destination point of a current travel of the occupant 104.

In accordance with an embodiment, the microprocessor 202a may be configured to retrieve the user profile information of the occupant 104 from the memory 204 and determine the delivery information 616 based on the retrieved user profile information on the first windshield display medium 116a. In some embodiments, the microprocessor 202a may be configured to retrieve the user profile information of the occupant 104 from the central server 122.

The user profile information may include, but is not limited to, frequent travel routes taken by the occupant 104, a home location of the occupant 104, a work location of the occupant 104, work timings of the occupant 104, upcoming travel schedules of the occupant 104, calendar information of the occupant 104. For example, the microprocessor 202a may determine based on the calendar information that the occupant 104 may need to attend a meeting after two days from the date of purchase of the selected product and the venue of the meeting may be near a warehouse from where the selected product may be delivered. In such case, the microprocessor 202a may be configured to determine the date and the time in the delivery information 616 as two days from the date of purchase.

In another example, the microprocessor 202a may be configured to determine that the occupant 104 may be travelling outside his/her home country based on the geo-location provided by the location sensor 216 and the home location of the occupant 104 stored in the user profile information. In such case, the microprocessor 202a may determine the venue of delivery in the delivery information 616 as the home location of the occupant 104. In some embodiments, the microprocessor 202a may determine the date and the time of the delivery information 616 as a day on/before a schedule of travel (stored in the user profile information) of the occupant 104 to the home location.

In accordance with an embodiment, in case of the determination that the occupant 104 may be travelling outside his/her home country, the microprocessor 202a may be configured to send a request to the central server 122 to determine whether the selected product is available (or launched) in the home country of the occupant 104. In case, the selected product is not available (or launched) in the home country of the occupant 104, the central server 122 may be configured to provide a number of such requests (say in a specific time period) to a manufacture of the selected product. The manufacture may gauge a demand of the selected product based on the number of such requests and take decision to launch the selected product in the home country of the occupant 1024.

In accordance with an embodiment, the microprocessor 202a may be configured to transmit the delivery information 616 to the central server 122. In some embodiments, delivery information 616 may further include information related to the destination point of the vehicle 102, information related to the route to be taken by the vehicle 102, and the determined speed of the vehicle 102. Such information may be utilized by a delivery drone associated with the first object-of-interest 106a (as the first physical shop) to directly deliver the selected product to the occupant 104 while travelling in the vehicle 102. In accordance with an embodiment, the vehicle 102 may include a landing or helipad structure (not shown) on a roof of the vehicle where the delivery drone may land to deliver the selected product.

Figure 7:
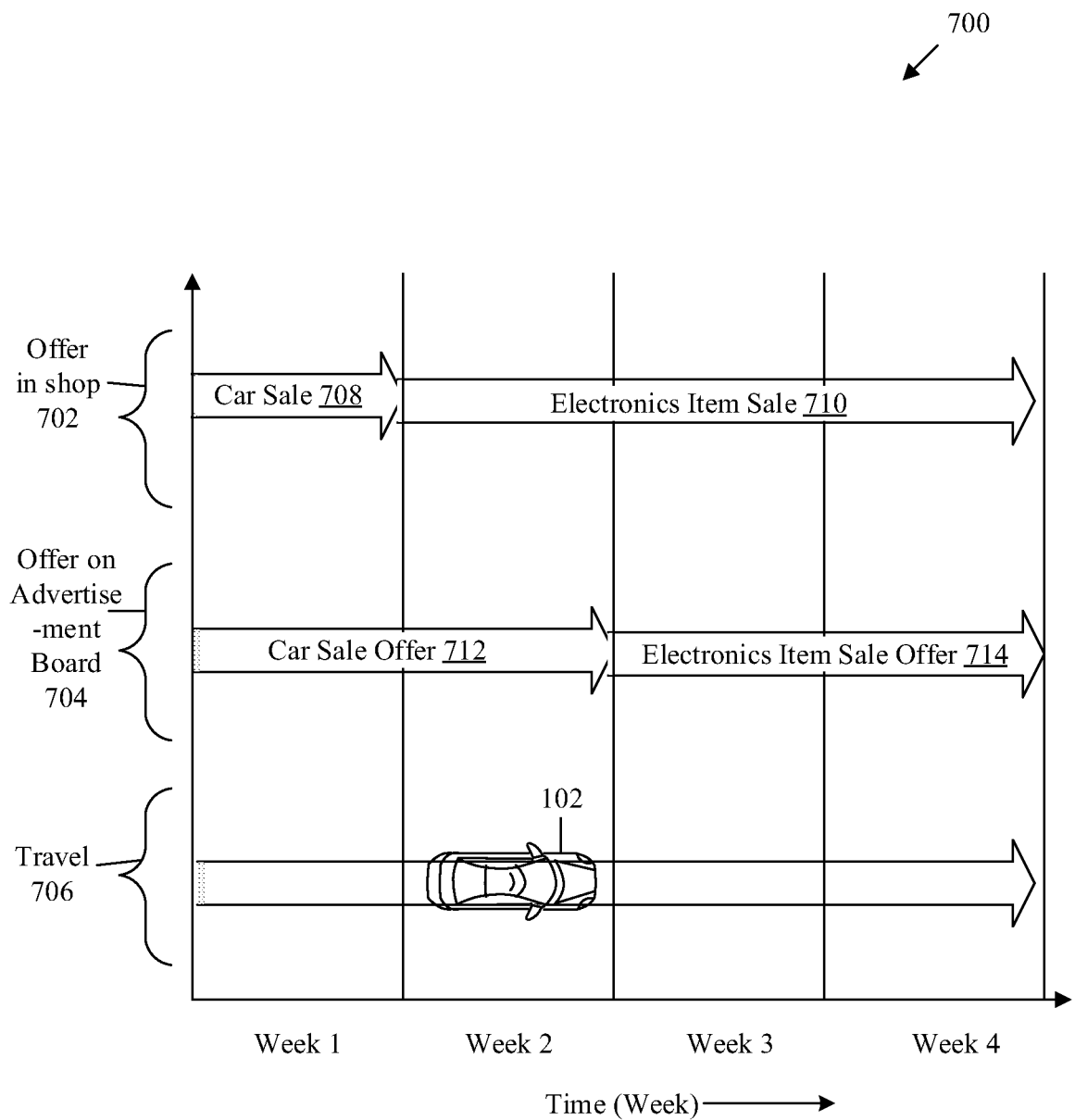
FIG. 7 illustrates a fourth exemplary scenario for selection of an offer associated with the object-of-interest surrounding a vehicle of FIG. 2, in accordance with an embodiment of the disclosure.

FIG. 7 illustrates a fourth exemplary scenario for selection of an offer associated with the object-of-interest surrounding a vehicle of FIG. 2, in accordance with an embodiment of the disclosure. FIG. 7 is explained in conjunction with elements from FIGS. 1, 2, 3, 4A, 4B, 5, 6A, 6B, and 6C. With reference to FIG. 7, there is shown a graphical representation 700 of a plurality of offers associated with the third object-of-interest 106c (represented as the advertisement board of FIG. 3) over a period of time. The graphical representation 700 may indicate the period of time in X-axis (for example period of time as 4 weeks). The graphical representation 700 may further indicate an offer in a shop 702, an offer on advertisement board 704, and travel 706 in Y-axis. The offer in the shop 702 may represent a first time period of validity during which the offer is valid in the shop 702 associated with the third object-of-interest 106c (represented as the advertisement board in FIG. 3). The offer on advertisement board 704 may represent a second time period of validity for which an advertisement was displayed on the third object-of-interest 106c (represented as the advertisement board). The travel 706 represents a time of travel by the vehicle 102.

With respect to FIG. 7, there is also shown a car sale 708 that may be valid for week 1 (i.e. the first time period of validity of the car sale 708) in the shop 702 and an electronics item sale 710 that may be valid on weeks 2 to 4 (i.e. the first time period of validity of the electronics item sale 710) in the shop 702. Further, there is also shown, an advertisement of a car sale offer 712 that may be on the advertisement board 704 for weeks 1 and 2 (i.e. the second time period of validity of the car sale offer 712 displayed on the advertisement board 704). Further, there is also shown, an advertisement of an electronics item sale offer 714 that may be on the advertisement board 704 for weeks 3 and 4 (i.e. i.e. the second time period of validity of the electronics item sale offer 714 displayed on the advertisement board 704).

For example, the vehicle 102 may be travelling during week 2, the occupant 104 may see the advertisement of the car sale offer 712, however the car sale 708 in the shop 702 may have been expired and the electronics item sale 710 in the shop 702 may be valid during week 2. In case, when the occupant 104 selects the car sale offer 712 (for example the third object-of-interest 106c of FIG. 1), the microprocessor 202a may be configured to transmit an offer confirmation request to the central server 122 or to a third local server 124c associated with the car sale offer 712 (the selected third object-of-interest 106c). The offer confirmation request may include information with respect to the car sale offer 712. In accordance with an embodiment, the offer confirmation request may be transmitted to confirm validity of the car sale offer 712 (as the selected third object-of-interest 106c) on week 2. The central server 122 or the third local server 124c associated with the shop 702 may transmit a response based on the received offer confirmation request. The response may include expiration information of the car sale 708 related to the car sale offer 712 (the selected third object-of-interest 106c) and validity information of the electronics item sale 710 for week 2. In accordance with an embodiment, the response received from the central server 122 or the third local server 124c may include detailed information related to the electronics item sale 710 for the occupant 104.

In accordance with an embodiment, the microprocessor 202a may be configured to display the received response on the first windshield display medium 116a for the occupant 104. In such case, the occupant 104 may decide not to shop an electronics item based on the received response (i.e. that indicates validity of the electronics item sale 710 in week 2) because the occupant 104 might be interest in the car sale offer 712 displayed on the advertisement board 704 in week 2).

In some embodiments, the received response may include future validity information for the car sale 710. The future validity information may indicate when the car sale 710 may be valid again in future (say after 1 month). The microprocessor 202a may receive the fourth input from the occupant 104 to select a product for the car sale 702 for shopping and set the date and the time of the delivery information 616 based on the future validity information. Thus, the disclosed media display system 108 may assist the occupant 104 with updated information about the displayed offers which may be selected as the object-of-interest by the occupant 104 from the surrounding of the vehicle 102. Such updated information may facilitate the occupant 104 to make rights decisions to proceed with the shopping or not for the selected object-of-interest (at least for the advertisement board or billboards which indicates sale offers).

Figure 8:
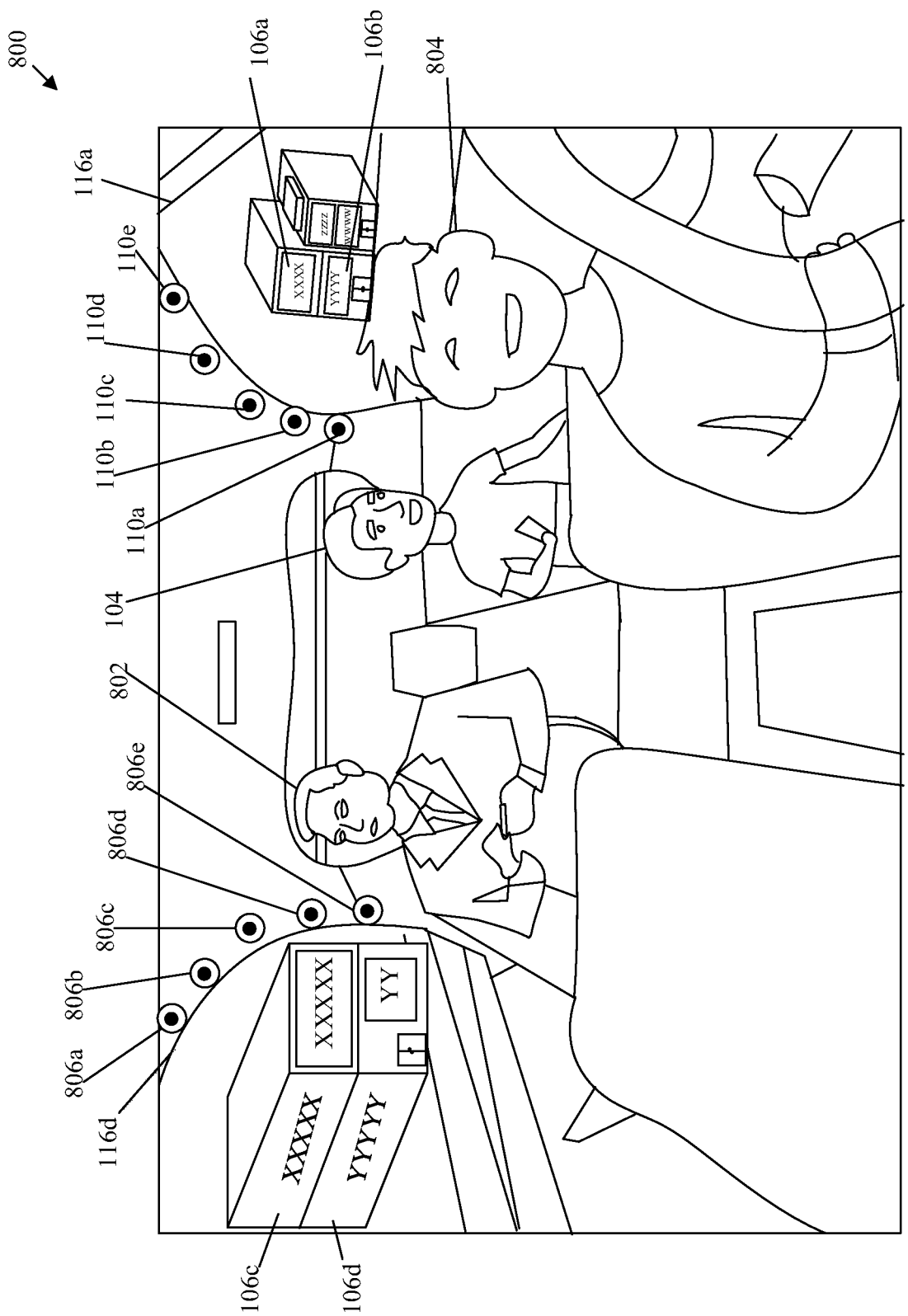
FIG. 8 illustrates a fifth exemplary scenario for control of display of interactive content based on direction-of-views of multiple occupants in a vehicle of FIG. 2, in accordance with an embodiment of the disclosure.

FIG. 8 illustrates a fifth exemplary scenario for control of display of interactive content based on direction-of-views of multiple occupants in a vehicle of FIG. 2. FIG. 8 is explained in conjunction with elements from FIGS. 1, 2, 3, 4A, 4B, 5, 6A, 6B, 6C, and 7. With reference to FIG. 8, there is shown a third interior environment 800 of the vehicle 102. The third interior environment 800 may include a first occupant (similar to the occupant 104), a second occupant 802, and a third occupant 804. The first occupant 104 may observe the first object-of-interest 106a outside the first windshield display medium 116a and the second occupant 802 may observe the third object-of-interest 106c outside the second windshield display medium 116b. With respect to FIG. 8, the third object-of-interest 106c may be a physical shop. The third occupant 804 may be a driver of the vehicle 102. With respect to FIG. 8, there is also shown the first plurality of image sensors 110a to 110e placed along the first windshield display medium 116a and a second plurality of image sensors 806a to 806e.

In accordance with an embodiment, the microprocessor 202a may be configured to control the first plurality of image sensors 110a to 110e to determine a first direction-of-view of the first occupant 104 as described in detail, for example in FIGS. 3 and 4B. In case the first direction-of-view may be towards the first object-of-interest 106a, the microprocessor 202a may be configured to display first interactive content (i.e. real-time or near-real time video feed associated with the first object-of-interest 106a) on the first windshield display medium 116a based on the selection of the first object-of-interest 106a by the occupant 104. The selection of the object-of-interest and display of the interactive content may be described in detail, for example in FIGS. 3, 5, 6A and 6B.

In accordance with an embodiment, the microprocessor 202a may be configured to control the second plurality of image sensors 806a to 806e to determine a second direction-of-view of the second occupant 802 as described in detail, for example in FIGS. 3 and 4B. In accordance with an embodiment, the second occupant 802 may select the third object-of-interest 106c (as physical shop) outside the second windshield display medium 116b for shopping. Further, the microprocessor 202a may be configured to display second interactive content (i.e. real-time or near-real time video feed associated with the third object-of-interest 106c) on the second windshield display medium 116b based on the selection of the third object-of-interest 106c by the occupant 802. Both the first occupant 104 and the second occupant 802 (travelling in same vehicle 102) may simultaneously navigate through different areas or products related to the first object-of-interest 106a and the third object-of-interest 106c on respective AR/VR enabled windshield display mediums (the first windshield display medium 116a and the second windshield display medium 116b). Thus, the media display system 108 may be able to provide different in-vehicle AR/VR shopping experiences simultaneously to multiple occupants (with respect to different object-of-interests viewed in the surroundings) while travelling through the vehicle 102.

Figure 9A:
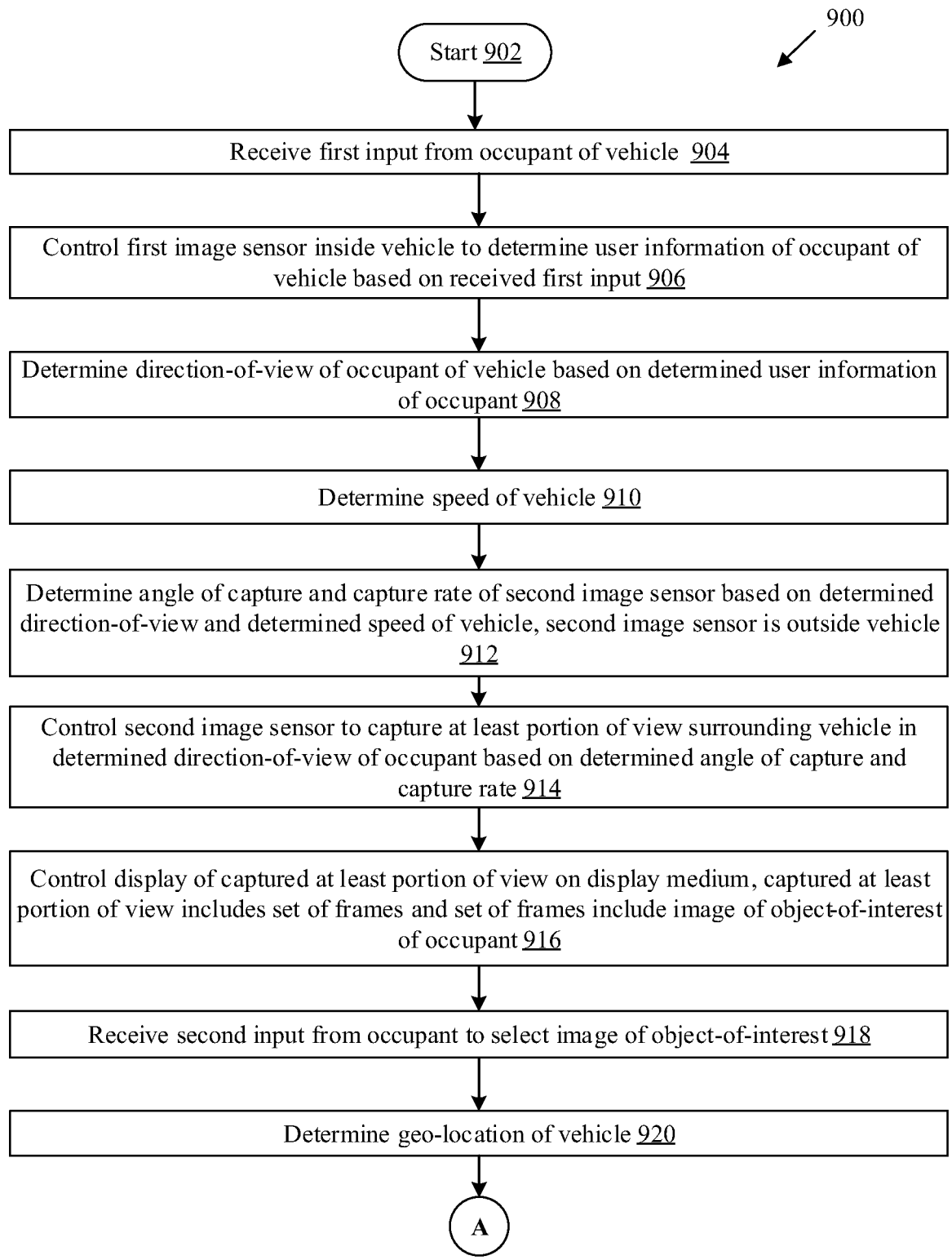
FIGS. 9A, 9B, and 9C, collectively, depict a flow chart that illustrates exemplary operations for control of display of interactive content based on direction-of-view of occupant in a vehicle, in accordance with an embodiment of the disclosure.
Figure 9B:
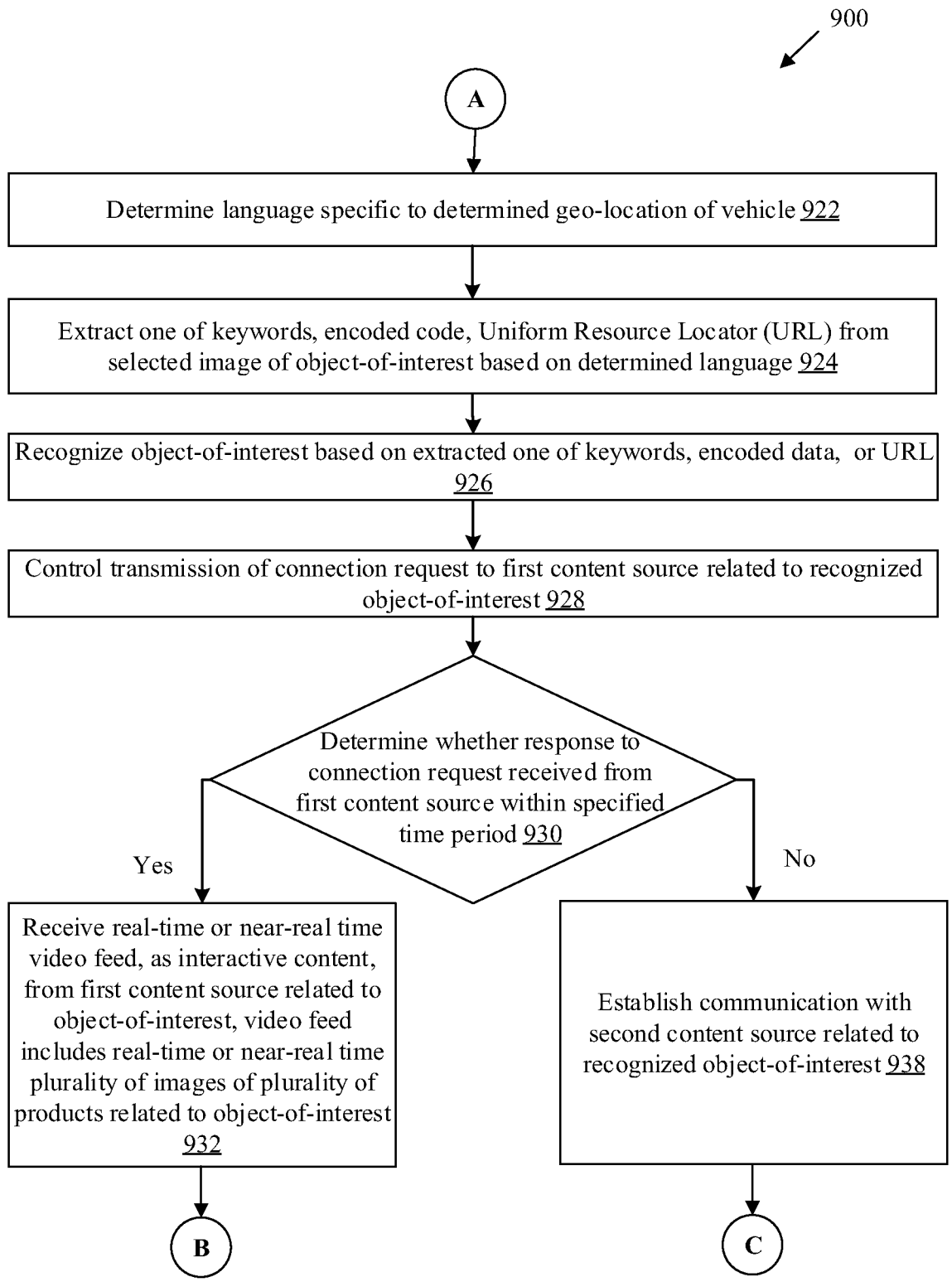
Figure 9C:
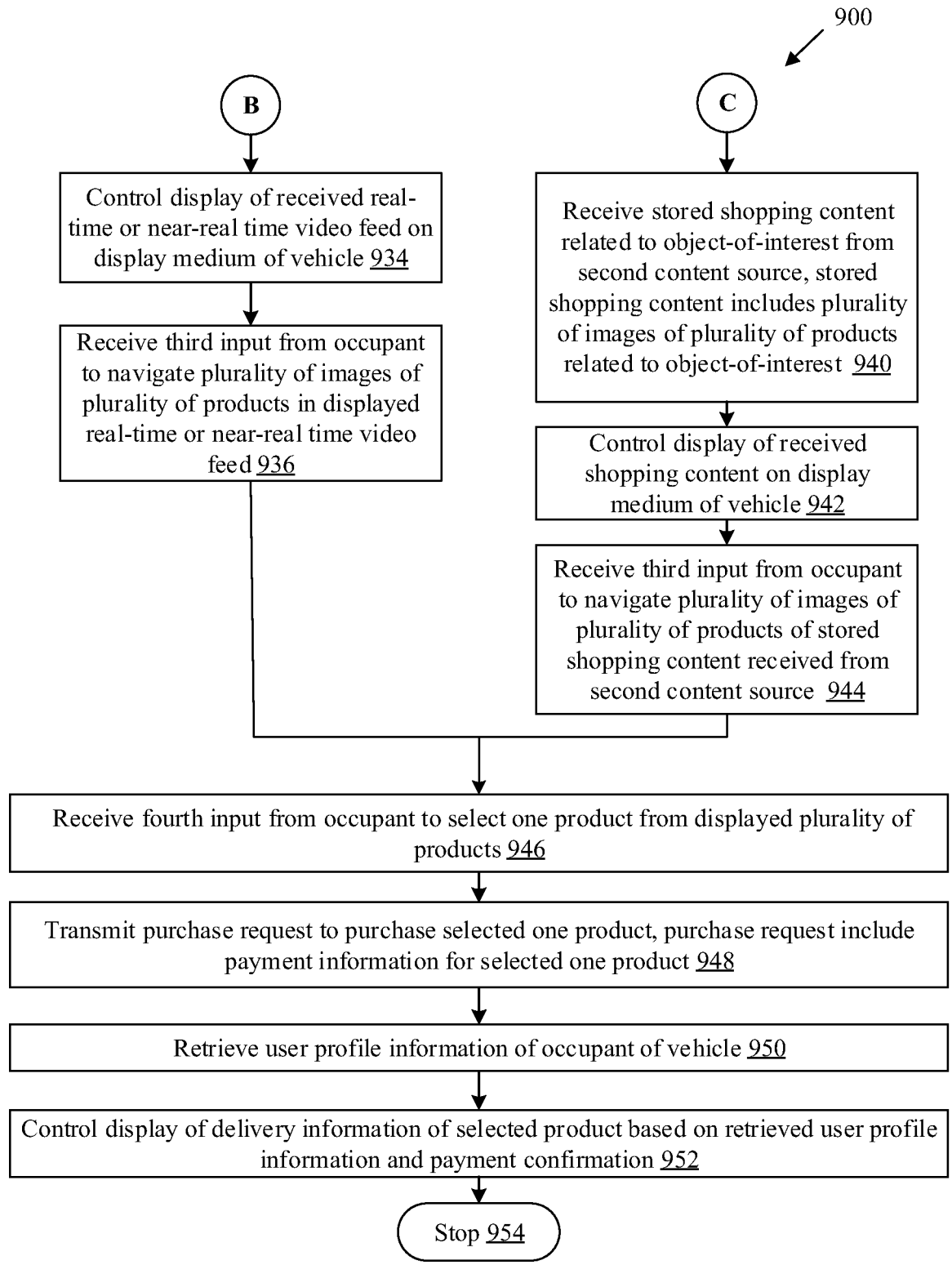

FIGS. 9A, 9B, and 9C, collectively, depict a flow chart that illustrates exemplary operations for control of display of interactive content based on direction-of-view of occupant in a vehicle, in accordance with an embodiment of the disclosure. With reference to FIGS. 9A, 9B, and 9C, there is shown a flowchart 900. The flowchart 900 is described in conjunction with FIGS. 1, 2, 3, 4A, 4B, 5, 6A, 6B, 6C, 7, and 8. The operations from 902 to 954 may be implemented in the media display system 108. The operations of the flowchart 900 may start at 902 and proceed to 954.

At 904, a first input may be received from the occupant 104 of the vehicle 102. In accordance with an embodiment, the microprocessor 202a may be configured to receive the first input, through the I/O interface 206, from the occupant 104 of the vehicle 102. Examples of the first input may include, are not limited to, the touch input, the gesture input, or the voice command.

At 906, a first image sensor may be controlled to determine user information of the occupant 104 of the vehicle 102 based on the received first input. In accordance with an embodiment, the first image sensor (i.e. one of the first plurality of image sensors 110a to 110e) may be placed inside the vehicle 102. the microprocessor 202a may be further configured to control the first image sensor (i.e. one of the first plurality of image sensors 110a to 110e to determine user information such as the head position or the eye gaze of the occupant 104. In accordance with another embodiment, instead of the first plurality of image sensors 110a to 110e, a single image sensor (i.e. only one image sensor 110a) may be placed inside the vehicle 102. The one image sensor 110a may be configured to determine the user information such as the head position or the eye gaze of the occupant 104 based on a comparison of a current image of the occupant 104 and the training data set saved in the machine learning (ML) database of the memory using a ML algorithm.

At 908, a direction-of-view of the occupant 104 of the vehicle 102 may be determined based on the determined user information of the occupant 104. In accordance with an embodiment, the microprocessor 202a may be configured to determine the direction-of-view of the occupant 104 based on the determined user information such as the head position and the eye gaze of the occupant 104. The determination of the direction-of-view of the occupant 104 of the vehicle 102 may be described in detail, for example, in FIG. 4B.

At 910, the speed of the vehicle 102 may be determined. In accordance with an embodiment, the microprocessor 202a may be configured to determine the speed of the vehicle 102 through the speed sensor 214.

At 912, the angle of capture $\mathcal{O}_3$ and the capture rate of the second image sensor 112 may be determined based on the determined direction-of-view and the determined speed of the vehicle 102. The second image sensor 112 may be placed outside the vehicle 102. In accordance with an embodiment, the microprocessor 202a may be configured to determine the angle of capture $\mathcal{O}_3$ and the capture rate of the second image sensor 112 based on the determined direction-of-view and the determined speed of the vehicle 102. The determination of the angle of capture $\mathcal{O}_3$ and the capture rate of the second image sensor 112 may be described in detail, for example in FIGS. 4B and 5.

At 914, the second image sensor 112 may be controlled to capture at least a portion of view surrounding the vehicle 102 in the determined direction-of-view of the occupant 104 based on the determined angle of capture $\mathcal{O}_3$ and the capture rate. In accordance with an embodiment, the microprocessor 202a may be configured to control the second image sensor 112 to capture at least the portion of view surrounding the vehicle 102 in the determined direction-of-view of the occupant 104. The control of the second image sensor 112 to capture in the determined direction-of-view of the occupant 104 may be described in detail, for example, in FIGS. 3, 4A and 4B

At 916, display of the captured at least portion of the view may be controlled on a display medium, the captured at least portion of the view may include a set of image frames that include an image of an object-of-interest. Examples of the object-of-interest may include, but are not limited to, roadside physical shop, a product within the physical shop, a logo, an advertisement board, or a billboard. In accordance with an embodiment, the microprocessor 204 may be configured to control display of the captured at least portion of the view on either of first display medium 114 or the second plurality of display mediums 116a to 116n as described in detail, for example in FIG. 3.

At 918, the second input may be received from the occupant 104 to select the image of the object-of-interest. In accordance with an embodiment, the microprocessor 202a may be configured to receive the second input from the occupant 104 of the vehicle 102 via the I/O interface 206. Examples of the second input may include, but are not limited to, the touch input, the gesture input, or the voice command. The selection of the object-of-interest may be described in detail, for example, in FIG. 5.

At 920, a geo-location of the vehicle 102 may be determined. In accordance with an embodiment, the microprocessor 202a may be configured to receive the geo-location of the vehicle 102 from the location sensor 216.

At 922, a language specific to the determined geo-location of the vehicle 102 may be determined. In accordance with an embodiment, the microprocessor 202a may be configured to determine the language specific to the determined geo-location of the vehicle 102 as described in detail, for example, in FIG. 3.

At 924, one of keywords, encoded code, text, or Uniform Resource Locator (URL) may be extracted from the selected image of the object-of-interest based on the determine language. In accordance with an embodiment, the microprocessor 202a may be configured to extract one of the keywords, the encoded code or the URL, from the selected image object-of-interest based on the determine language.

At 926, the object-of-interest may be recognized based on the extracted one of the keywords, encoded data or the URL. In accordance with an embodiment, the microprocessor 202a may be configured to recognize the object-of-interest based on the extracted one of the keywords, encoded data, or the URL. The recognition of the object-of-interest based on the extracted one of the keywords, encoded data, or the URL may be described in detail, for example, in FIG. 3.

At 928, transmission of a connection request to a first content source related to the recognized object-of-interest may be controlled. In accordance with an embodiment, the microprocessor 202a may be configured to control the transmission of the connection request to the first content source (either of the central server 122 or one of the plurality of local servers 124a to 124d) related to the recognized object-of-interest.

At 930, it may be determined whether a response to the connection request may be received from the first content source within a specified time period. In accordance with an embodiment, the microprocessor 202a may be configured to determine whether a response to the connection request may be received from the first content source within the specified time period. In a case, when the response is received within the specified period of time then the control passes to 932. In another case, when the response is not received in the specified period of time then the control passes to 938.

At 932, a real-time or a near-real time video feed, as interactive content, may be received from the first content source related to the object-of-interest. The video feed may include a real-time or a near-real time plurality of images of a plurality of products related to the object-of-interest. In accordance with an embodiment, the microprocessor 202a may be configured to receive the real-time or the near-real time video feed captured by an internal camera related to the object-of-interest 106a. The receipt of the real-time or a near-real time video feed from the first content source may be described in detail, for example, in FIG. 3 as the online state of communication between the media display system 108 and the first content source.

At 934, display of the received real-time or near-real time video feed on the display medium may be controlled. In accordance with an embodiment, the microprocessor 202a may be configured to control display of the received real-time or near-real time video feed on the display medium as described in detail, for example, in FIG. 6A.

At 936, a third input may be received from the occupant 104 to navigate the plurality of products in the displayed real-time or near-real time video feed. In accordance with an embodiment, the microprocessor 202a may be configured to receive the third input from the occupant 104 of the vehicle 102 via the I/O interface 206. The navigation of the plurality of products in the displayed real-time or near-real time video feed by the occupant 104 may be described in detail, for example, in FIGS. 6A and 6B. Control then passes to 946.

At 938, communication with a second content source related to the recognized object-of-interest may be established. In accordance with an embodiment, the microprocessor 202a may be configured to establish the communication with the second content source related to the recognized object-of-interest via the communication system 208. The second content source may be configured to store shopping content related to the recognized object-of-interest. The stored shopping content may not correspond to the real-time or near-real time video feed related to the recognized object-of-interest. The stored shopping content may include, but is not limited to, a predefined website related to the recognized object-of-interest, stored product information related to the recognized object-of-interest, or a past stored video feed related to the recognized object-of-interest.

At 940, the stored shopping content related to the object-of-interest may be received from the second content source. The received shopping content may include a plurality of images of a plurality of products related to the object-of-interest. In accordance with an embodiment, the microprocessor 202a may be configured to receive the stored shopping content related to the object-of-interest from the second content source.

At 942, display of the received shopping content on the display medium may be controlled. In accordance with an embodiment, the microprocessor 202a may be configured to control display of the received shopping content on the display medium.

At 944, the third input may be received from the occupant 104 to navigate the plurality of images of the plurality of products of the shopping content received from the second content source. In accordance with an embodiment, the microprocessor 202a may be configured to receive the third input from the occupant 104 via the I/O interface 206. Control then passes to 946.

At 946, a fourth input may be received from the occupant 104 to select one product from the displayed plurality of products. In accordance with an embodiment, the microprocessor 202a may be configured to receive the fourth input from the occupant 104 of the vehicle 102 via the I/O interface 206.

At 948, a purchase request to purchase the selected one product may be transmitted. The purchase request may include payment information of the selected one product. In accordance with an embodiment, the microprocessor 202a may be configured to transmit the purchase request to purchase the selected one product, via the communication system 208 to the first content source.

At 950, user profile information of the occupant 104 may be retrieved. In accordance with an embodiment, the microprocessor 202a may be configured to retrieve the user profile information stored in one of the memory 204 or the central server. The user profile information may be described in detail, for example, in FIG. 6C.

At 952, display of delivery information of the selected product may be controlled based on the retrieved user profile information and payment confirmation. In accordance with an embodiment, the microprocessor 202a may be configured to display the delivery information of the selected product on the display medium (one of the first display medium 114 or one of the second plurality of display mediums 116a to 116n) based on the retrieved user profile information and payment confirmation may be described in detail, for example, in FIG. 6. The control passes to end 954.

Various embodiments of the disclosure provide a media display system (e.g. media display system 108) for a vehicle (e.g. the vehicle 102). The media display system 108 may include a first image sensor (e.g. one of the first plurality of image sensors 110a to 110e) inside the vehicle. The first image sensor may be configured to capture a first view of an interior of the vehicle 102. The media display system 108 may further include a second image sensor (e.g. second image sensor 112) outside the vehicle 102. The second image sensor 112 may be configured to capture a second view surrounding the vehicle 102. The media display system 108 may further include an electronic device in the vehicle 102. The electronic device may include a microprocessor (e.g. microprocessor 202a). The microprocessor 202a may be configured to receive, on a first display medium (e.g. first display medium 114), a first input from a first occupant (e.g. occupant 104) in the vehicle 102. The microprocessor 202a may be further configured to control the first image sensor to determine user information of the first occupant 104 based on the received first input. The microprocessor 202a may be further configured to determine a first direction-of-view of the first occupant 104 based on the determined user information of the first occupant 104. The microprocessor 202a may be further configured to control the second image sensor 114 to capture at least a first portion of the second view surrounding the vehicle 102 in the determined first direction-of-view of the first occupant 104. The microprocessor 202a may be further configured to control display of at least the first portion of the captured second view on the first display medium 114 of the vehicle 102. Each image frame of a first set of image frames in at least the first portion of the captured second view may be selectable. The first set of image frames may include a first image of a first object-of-interest of the first occupant 104. The microprocessor 202a may be further configured to control display of first interactive content on the first display medium 114 based on a second input on the first image of the first object-of-interest. The first interactive content may be related to the first object-of-interest.

In accordance with an embodiment, the microprocessor 202a may be further configured to transmit a connection request to establish a first communication with a first content source related to the first object-of-interest. The microprocessor 202a may be further configured to receive a response from the first content source within a specific time period based on the transmitted connection request. The microprocessor 202a may be further configured to establish the first communication with the first content source based on the receipt of the response within the specific time period.

In accordance with an embodiment, the microprocessor 202a may be further configured to establish a second communication with a second content source related to the first object-of-interest based on a lapse of the specific time period. The microprocessor 202a may be further configured to receive shopping content related to the first object-of-interest from the second content source. The microprocessor 202a may be further configured to control display of the received shopping content, as the first interactive content, on the first display medium 114 for the first occupant.

In accordance with an embodiment, at least one image of the first set of images frames may include first sale-offer information related to the first object-of-interest. The microprocessor 202a may be further configured to transmit the first sale-offer information to the first content source and receive second sale-offer information, different from the first sale-offer information, from the first content source. The first content source may select the second sale-offer information based on a time period of validity of the second sale-offer information and a time period of validity of the first sale-offer information.

In accordance with an embodiment, the microprocessor 202a may be further configured to receive a real-time or a near-real time video feed from the first content source related to the first object-of-interest based on the established first communication. The microprocessor 202a may be further configured to control display of the received real-time or near-real time video feed on the first display medium 114 for the first occupant 104. The real-time or a near-real time video feed may include a plurality of images of a plurality of products related to the first object-of-interest. The microprocessor 202a may be further configured to receive a third input to navigate the plurality of images of the plurality of products in the displayed real-time video feed related to the first object-of-interest. The microprocessor 202a may be further configured to receive a fourth input to select a product from the plurality of products in the displayed real-time or near-real time video feed related to the first object-of-interest. The microprocessor 202a may be further configured to transmit a request to purchase the selected product to the first content source based on the received fourth input.

In accordance with an embodiment, the microprocessor 202a may be further configured to control display of a sliding window on the first display medium 114, wherein the sliding window comprises the first set of image frames.

In accordance with an embodiment, the microprocessor 202a may be further configured to retrieve a speed of the vehicle in a motion state from speed sensor of the vehicle. The microprocessor 202a may be further configured to determine an angle of capture of the second image sensor from a second reference line (e.g. second reference line 412) based on the determined first direction-of-view of the first occupant, and the speed of the vehicle. The angle of capture of the second image sensor may be greater than an angle between the determined first direction-of-view and a first reference line (e.g. first reference line 406) with respect to the first occupant 104.

In accordance with an embodiment, the microprocessor 202a may be further configured to retrieve a speed of the vehicle in a motion state from a speed sensor of the vehicle. The microprocessor 202a may be further configured to control a capture rate of the second image sensor to capture at least the first portion of the second view surrounding the vehicle in the determined first direction-of-view of the first occupant, based on the retrieved speed of the vehicle in the motion state.

In accordance with an embodiment, the first object-of-interest may include a representation of at least one of a physical shop, a product within the physical shop, a logo, an advertisement board, or a billboard.

In accordance with an embodiment, the microprocessor 202a may be further configured to extract keywords from the first set of images in a language specific to a geo-location of the vehicle 102. The microprocessor 202a may be further configured to recognize the first object-of-interest based on the extracted keywords and the geo-location of the vehicle. The geo-location may be used as a reference to associate a meaning of the extracted keyword in context of the geo-location.

In accordance with an embodiment, the first image of the first object-of-interest may include at least one of a uniform resource location (URL) or an encoded code related to the object-of-interest. The microprocessor 202a may be further configured to recognize the first object-of-interest based on a geo-location of the vehicle and at least one of the uniform resource location (URL) or the encoded code in the first image related to the first object-of-interest.

In accordance with an embodiment, the microprocessor 202a may be further configured to receive, on a second display medium (e.g. one of second plurality of display mediums 116a to 116n), a fifth input from a second occupant (e.g. second occupant 802) in the vehicle 102. The microprocessor 202a may be further configured to control a third image capturing sensor (e.g. one of second plurality of image sensors 806a to 806e), different from the first image sensor (e.g. one of the first plurality of image sensors 110a to 110e), to determine second user information of the second occupant 802 based on the received fifth input. The microprocessor 202a may be further configured to determine a second direction-of-view of the second occupant based on the determined at least one of the second head position or the second eye gaze of the second occupant. The microprocessor 202a may be further configured to control the second image sensor 112 to capture at least a second portion of the second view surrounding the vehicle in the determined second direction-of-view of the second occupant 802. The microprocessor 202a may be further configured to control display of at least the second portion of the captured second view on the second display medium of the vehicle. Each image frame of a second set of image frames in at least the second portion of the captured second view is selectable. The second set of image frames may include a second image of a second object-of-interest of the second occupant. The microprocessor 202a may be further configured to control display of second interactive content on the second display medium based on a sixth input on the second object-of-interest in the second image. The second interactive content may be related to the second object-of-interest.

In accordance with an embodiment, the microprocessor 202a may be further configured to receive destination information of travel of the vehicle 102 from the first occupant 104 and control display of the first interactive content on the first display medium 114 based on the received destination information. In accordance with an embodiment, the microprocessor 202a may be further configured to determine user profile information of the first occupant. The user profile information may include home location information of the first occupant 104. The microprocessor 202a may be further configured to control display of the first interactive content on the first display medium 114 based on a geo-location of the vehicle 102 and the determined user profile information of the first occupant 104.

Various embodiments of the disclosure provide an electronic device for a vehicle (e.g. the vehicle 102). The electronic device (e.g. the electronic device 202) may include a microprocessor (e.g. microprocessor 202a). The microprocessor 202a may be configured to receive, on a display medium (e.g. display medium 114), a first input from an occupant (e.g. occupant 104) in the vehicle 102. The microprocessor 202a may be further configured to control a first image sensor (e.g. one of the first plurality of image sensors 110a to 110e), inside the vehicle, to determine user information of the occupant 104 based on the received first input. The microprocessor 202a may be further configured to determine a direction-of-view of the occupant 104 based on the determined user information of the occupant 104. The microprocessor 202a may be further configured to control the second image sensor (e.g. second image sensor 114), outside the vehicle to capture at least a portion of a view surrounding the vehicle 102 in the determined direction-of-view of the first occupant 104. The microprocessor 202a may be further configured to control display of at least the portion of the captured view on the display medium 114 of the vehicle 102. Each image frame of a set of image frames in at least the portion of the captured view may be selectable. The set of image frames may include an image of an object-of-interest of the occupant 104. The microprocessor 202a may be further configured to control display of interactive content on the display medium 114 based on a second input on the image of the object-of-interest. The interactive content may be related to the object-of-interest.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A media display system for a vehicle, the media display system comprising:
　a first image sensor inside the vehicle, wherein the first image sensor is configured to capture a first view of an interior of the vehicle;
　a second image sensor outside the vehicle, wherein the second image sensor is configured to capture a second view surrounding the vehicle; and
　an electronic device in the vehicle, wherein
　　the electronic device comprises a microprocessor, and
　　the microprocessor is configured to:
　　　receive, on a first display medium, a first input from a first occupant in the vehicle;
　　　control the first image sensor to determine first user information of the first occupant based on the received first input;
　　　determine a first direction-of-view of the first occupant based on the determined first user information;
　　　retrieve a speed of the vehicle in a motion state from a speed sensor of the vehicle;
　　　determine an angle of capture of the second image sensor from a first reference line, wherein
　　　　the angle of capture is determined based on the determined first direction-of-view of the first occupant and the retrieved speed of the vehicle,
　　　　the angle of capture of the second image sensor is greater than or equal to an angle between the determined first direction-of-view of the first occupant and a second reference line,
　　　　the second reference line indicates a direction of travel of the vehicle,
　　　　the second image sensor is further configured to capture at least a first portion of the second view surrounding the vehicle in the determined first direction-of-view of the first occupant, and
　　　　at least the first portion of the second view surrounding the vehicle is captured based on the determined angle of capture of the second image sensor;
　　　control display of the captured at least the first portion of the second view on the first display medium of the vehicle, wherein
　　　　each image frame of a first set of image frames in the captured at least the first portion of the second view is selectable, and
　　　　the first set of image frames includes a first image of a first object-of-interest of the first occupant;
　　　select the first image of the first object-of-interest based on a second input on the first image;
　　　extract a geo-location of the vehicle;
　　　determine, based on the extracted geo-location, a language specific to the geo-location of the vehicle;
　　　extract keywords from the selected first image in the language specific to the geo-location of the vehicle, wherein the geo-location is a reference to associate a meaning of the extracted keywords from the first image in context of the geo-location;
　　　recognize the first object-of-interest based on the extracted keywords; and
　　　control display of first interactive content on the first display medium based on the recognized first object-of-interest, wherein the first interactive content is associated with the first object-of-interest.

2. The media display system according to claim 1, wherein the microprocessor is further configured to:
　control transmission of a connection request to establish a first communication with a first content source related to the first object-of-interest;
　control reception of a response from the first content source based on the transmitted connection request; and
　establish the first communication with the first content source based on the receipt of the response.

3. The media display system according to claim 2, wherein the microprocessor is further configured to:
　establish a second communication with a second content source associated with the first object-of-interest based on a lapse of a time period from a time of the transmission of the connection request;
　control reception of shopping content associated with the first object-of-interest from the second content source; and
　control display of the received shopping content, as the first interactive content, on the first display medium for the first occupant.

4. The media display system according to claim 2, wherein
　at least one image of the first set of image frames includes first sale-offer information related to the first object-of-interest,
　the microprocessor is further configured to:
　　control transmission of the first sale-offer information to the first content source; and
　　control reception of second sale-offer information, different from the first sale-offer information, from the first content source, and
　the first content source selects the second sale-offer information based on a time period of validity of the second sale-offer information and a time period of validity of the first sale-offer information.

5. The media display system according to claim 2, wherein
　the microprocessor is further configured to:
　　control reception of one of a real-time video feed or a near-real time video feed from the first content source associated with the first object-of-interest; and
　　control display of the received one of the real-time video feed or the near-real time video feed on the first display medium for the first occupant, and
　the one of the real-time video feed or the near-real time video feed is received based on the established first communication.

6. The media display system according to claim 5, wherein
the received one of the real-time video feed or the near-real time video feed includes a plurality of images,
the plurality of images corresponds to a plurality of products associated with the first object-of-interest, and
the microprocessor is further configured to receive a third input to navigate the plurality of images in the displayed one of the real-time video feed or the near-real time video feed.

7. The media display system according to claim 6, wherein the microprocessor is further configured to:
receive a fourth input to select a product from the plurality of products in the displayed one of the real-time video feed or the near-real time video feed; and
control transmission of a request to purchase the selected product to the first content source, wherein the transmission of the request is based on the received fourth input.

8. The media display system according to claim 1, wherein
the microprocessor is further configured to control display of a sliding window on the first display medium, and
the sliding window comprises the first set of image frames.

9. The media display system according to claim 1, wherein
the microprocessor is further configured to control a capture rate of the second image sensor to capture at least the first portion of the second view surrounding the vehicle in the determined first direction-of-view of the first occupant, and
the capture rate of the second image sensor is controlled based on the retrieved speed of the vehicle in the motion state.

10. The media display system according to claim 1, wherein the first object-of-interest comprises a representation of at least one of a physical shop, a product within the physical shop, a logo, an advertisement board, or a billboard.

11. The media display system according to claim 1, wherein
the first image of the first object-of-interest comprises at least one of a uniform resource location (URL) associated with the first object-of-interest or an encoded code associated with the first object-of-interest, and
the microprocessor is further configured to recognize the first object-of-interest based on the at least one of the uniform resource location (URL) or the encoded code in the first image.

12. The media display system according to claim 1, wherein the microprocessor is further configured to:
receive, on a second display medium, a third input from a second occupant in the vehicle;
control a third image sensor, different from the first image sensor, to determine second user information of the second occupant based on the received third input;
determine a second direction-of-view of the second occupant based on the determined second user information of the second occupant;
control the second image sensor to capture at least a second portion of the second view surrounding the vehicle in the determined second direction-of-view of the second occupant;
control display of the captured at least the second portion of the second view on the second display medium of the vehicle, wherein
each image frame of a second set of image frames in the captured at least the second portion of the second view is selectable, and
the second set of image frames includes a second image of a second object-of-interest of the second occupant; and
control display of second interactive content on the second display medium based on a fourth input on the second object-of-interest in the second image, wherein the second interactive content is associated with the second object-of-interest.

13. The media display system according to claim 1, wherein the microprocessor is further configured to:
receive destination information of the travel of the vehicle from the first occupant; and
control display of the first interactive content on the first display medium based on the received destination information.

14. The media display system according to claim 1, wherein the microprocessor is further configured to:
determine user profile information of the first occupant, wherein the user profile information comprises home location information of the first occupant; and
control display of the first interactive content on the first display medium based on the determined user profile information of the first occupant.

15. The media display system according to claim 1, wherein
the microprocessor is further configured to:
control a third image sensor to capture a third image of the first occupant based on the first input; and
determine the first user information of the first occupant based on a comparison of the captured third image with a training data set,
the first user information includes at least one of a head position of the first occupant or an eye gaze of the first occupant, and
the training data set comprises a plurality of images of the first occupant captured before the reception of the first input.

16. An electronic device for a vehicle, the electronic device comprising:
a microprocessor configured to:
receive, on a display medium, a first input from an occupant in the vehicle;
control a first image sensor, inside the vehicle, to determine user information of the occupant based on the received first input;
determine a direction-of-view of the occupant based on the determined user information of the occupant;
retrieve a speed of the vehicle in a motion state from a speed sensor of the vehicle;
determine an angle of capture of a second image sensor from a first reference line, wherein
the angle of capture is determined based on the determined direction-of-view of the occupant and the retrieved speed of the vehicle,
the angle of capture of the second image sensor is greater than or equal to an angle between the determined direction-of-view of the occupant and a second reference line,
the second reference line indicates a direction of travel of the vehicle, and
the second image sensor is outside the vehicle;
control the second image sensor to capture at least one portion of a view surrounding the vehicle in the determined direction-of-view of the occupant, wherein at least the one portion of the view surrounding the vehicle is captured based on the determined angle of capture of the second image sensor;

control display of the captured at least the one portion of the view on the display medium of the vehicle, wherein
each image frame of a set of image frames in the captured at least the one portion of the view is selectable, and
the set of image frames includes an image of an object-of-interest of the occupant;

select the image of the object-of-interest based on a second input on the image;

extract a geo-location of the vehicle;

determine, based on the extracted geo-location, a language specific to the geo-location of the vehicle;

extract keywords from the selected image in the language specific to the geo-location of the vehicle, wherein the geo-location is a reference to associate a meaning of the extracted keywords from the first image in context of the geo-location;

recognize the object-of-interest based on the extracted keywords; and control display of interactive content on the display medium based on the recognized object-of-interest, wherein the interactive content is associated with the object-of-interest.

17. A method, comprising:
in an electronic device for a vehicle:
receiving, on a display medium, a first input from an occupant in the vehicle;
controlling a first image sensor, inside the vehicle, to determine user information of the occupant based on the received first input;
determining a direction-of-view of the occupant based on the determined user information of the occupant;
retrieving a speed of the vehicle in a motion state from a speed sensor of the vehicle;
determining an angle of capture of a second image sensor from a first reference line, wherein
the angle of capture is determined based on the determined direction-of-view of the occupant and the retrieved speed of the vehicle,
the angle of capture of the second image sensor is greater than or equal to an angle between the determined direction-of-view of the occupant and a second reference line,
the second reference line indicates a direction of travel of the vehicle, and
the second image sensor is outside the vehicle;
controlling the second image sensor to capture at least one portion of a view surrounding the vehicle in the determined direction-of-view of the occupant, wherein at least the one portion of the view surrounding the vehicle is captured based on the determined angle of capture of the second image sensor;
controlling display of the captured at least the one portion of the view on the display medium of the vehicle, wherein
each image frame of a set of image frames in the captured at least the one portion of the view is selectable, and
the set of image frames includes an image of an object-of-interest of the occupant;
selecting the image of the object-of-interest based on a second input on the image;
extracting a geo-location of the vehicle;
determining, based on the extracted geo-location, a language specific to the geo-location of the vehicle;
extracting keywords from the selected image in the language specific to the geo-location of the vehicle, wherein the geo-location is a reference to associate a meaning of the extracted keywords from the first image in context of the geo-location;
recognizing the object-of-interest based on the extracted keywords; and
controlling display of interactive content on the display medium based on the recognized object-of-interest, wherein the interactive content is associated with the object-of-interest.

18. The method according to claim 17, wherein the object-of-interest comprises a representation of at least one of a physical shop, a product within the physical shop, a logo, an advertisement board, or a billboard.

19. The method according to claim 17, further comprising controlling display of a sliding window on the display medium, wherein
the sliding window includes the set of image frames, and
at least one object of a plurality of objects in the set of image frames is selectable for a time period.

* * * * *